United States Patent
Shimizu et al.

(10) Patent No.: US 7,013,401 B2
(45) Date of Patent: Mar. 14, 2006

(54) PROCESSOR CAPABLE OF PREVENTING SLEEP/HOLD STATE BASED ON A DIFFERENCE BETWEEN A PROCESSING BLOCK ADDRESS AND A WRITING BLOCK ADDRESS

(75) Inventors: Shiro Shimizu, Ibaraki (JP); Tsuyoshi Takayama, Otsu (JP); Hiroshi Yasuda, Hirakata (JP)

(73) Assignee: Matsushita Electric Industrial Co., Ltd., (JP)

( * ) Notice: Subject to any disclaimer, the term of this patent is extended or adjusted under 35 U.S.C. 154(b) by 547 days.

(21) Appl. No.: 10/234,857

(22) Filed: Sep. 5, 2002

(65) Prior Publication Data

US 2003/0046600 A1    Mar. 6, 2003

(30) Foreign Application Priority Data

Sep. 6, 2001    (JP)    ............................. 2001-269615

(51) Int. Cl.
*G06F 1/26* (2006.01)
*G06F 1/32* (2006.01)

(52) U.S. Cl. ..................... 713/322; 713/300; 713/323
(58) Field of Classification Search ............... 713/322, 713/600, 601, 300, 323; 711/167, 168, 169
See application file for complete search history.

(56) References Cited

U.S. PATENT DOCUMENTS

| | | | | |
|---|---|---|---|---|
| 5,394,106 A | * | 2/1995 | Black et al. | 327/107 |
| 5,459,846 A | * | 10/1995 | Hyatt | 711/214 |
| 5,920,888 A | | 7/1999 | Shirotori et al. | 711/128 |
| 6,401,163 B1 | * | 6/2002 | Kondo et al. | 711/100 |
| 6,505,319 B1 | * | 1/2003 | Kodama | 714/752 |
| 6,779,122 B1 | * | 8/2004 | George et al. | 713/330 |

OTHER PUBLICATIONS

Xilinx, "HDL Synthesis and Built-In Clock Enables", Quarterly Journal for Xilinx Programmable Logic Users Xcell 21, second quarter, 1996.*

* cited by examiner

*Primary Examiner*—Thomas Lee
*Assistant Examiner*—Ji H. Bae
(74) *Attorney, Agent, or Firm*—Steptoe & Johnson LLP

(57) ABSTRACT

The present invention provides a clock control type processor which can permit and accommodate a temporary delay in a processing operation also in a system in which processing times are not constant, and realize the accommodation while reducing the power consumption as much as possible. In this clock control type processor, a block difference detection circuit 20 detects a difference between a processing block address and a writing block address and outputs a block difference signal 105, and a clock control circuit 16 controls a clock.

26 Claims, 19 Drawing Sheets

PROCESSOR CAPABLE OF PREVENTING SLEEP/HOLD STATE BASED ON A DIFFERENCE BETWEEN A PROCESSING BLOCK ADDRESS AND A WRITING BLOCK ADDRESS

FIELD OF THE INVENTION

The present invention relates to a clock control type processor and, more particularly, to an improved processor in an operation system that temporarily stores data in a buffer memory to perform processing.

BACKGROUND OF THE INVENTION

FIG. 16 is a diagram illustrating an example of a conventional operation system that temporarily stores data in a buffer memory to perform processing.

The conventional clock control type processor can control supply and stop of a clock by the processor itself, without requiring control by an external microcomputer or the like.

In FIG. 16, a buffer memory 11 is constituted by a high-capacity memory element such as a DRAM. This buffer memory 11 is divided into plural areas, each corresponding to a block which is subjected to processing such as error correction for a DVD, and one address is allocated to one block. There are three kinds of operations in which accesses to the buffer memory are made, i.e., a writing operation, a processing operation, and a reading operation, and the accesses are made by a writing control circuit 12, a processing circuit 13, and a reading control circuit 14, respectively. An address generation circuit 15 controls an address at which the access to the buffer memory 11 is made by these accessing systems, respectively, to perform control for avoiding an overflow or underflow in the buffer memory 11, and makes the buffer memory 11 carry out a ring operation. In this ring operation for example, the address is successively incremented by "1" from the minimum value of the address ("0"), then returned to "0" after reaching its maximum value "n+1" (n is 0 or a positive integer), and thereafter the same operation is repeated. A clock control circuit 16 generates an operation clock 102 for the processing circuit 13 under the control of a basic clock 101. The clock control circuit 16 can activate the operation clock 102 in accordance with a writing completion signal 103 from the writing control circuit 12, and stop the operation clock 102 in accordance with a processing end signal 104 from the processing circuit 13.

FIG. 17 is a diagram specifically illustrating a structure of the clock control circuit 16 in FIG. 16.

In FIG. 17, the clock control circuit 16 receives the basic clock 101, and generates the operation clock 102 that is supplied to a control target. At this time, the writing completion signal 103 is inputted through an operation signal line 16a and the processing end signal 104 is inputted through a stop signal line 16b, to a R-S flipflop 18 in the clock control circuit 16, respectively. When the R-S flipflop 18 gets into a set state in accordance with the writing completion signal 103, the basic clock 101 is passed through an AND circuit 19, and then the operation clock 102 is supplied. Thereafter, the processing end signal 104 is inputted, and then the R-S flipflop 18 gets into a reset state, whereby the supply of the operation clock 102 is stopped by the AND circuit 19. The supply of the clock is resumed in accordance with the next writing completion signal 103.

FIG. 18 is a timing chart for explaining the prior art as shown in FIG. 16.

As shown in FIG. 18, the writing control circuit 12 writes inputted data 106 at an address in the buffer memory 11, specified by the address generation circuit 15. When the writing corresponding to one block in the memory area is completed, the writing control circuit 12 outputs the writing complete signal 103, and writes data in the next block area. The processing circuit 13 subjects the data corresponding to one block, which have already been written into the memory, to processing. When predetermined processing is finished, the processing circuit 13 outputs the processing end signal 104 to make the clock control circuit 16 stop the operation clock 102 for the processing circuit 13. Thereafter, the operation clock 102 is stopped during a period in which the processing circuit 13 does not perform processing until it is activated by the writing completion signal 103 for the next block, thereby reducing power consumption.

In the operation of the conventional clock control type processor, it is premised that a processing time in the processing circuit is shorter than a time of writing corresponding to one block at an approximately constant input rate. When this premise is met, the processing circuit is kept in a waiting state until writing of the next block is completed, and the operation clock for the processing circuit is stopped during this time, thereby reducing power consumption.

However, in the conventional operation system, there is no guarantee that the writing time, the reading time, and the processing time are fixed. For example, in a case where this system is applied to a DVD decoder, the writing time varies with the rate of inputted data, and the processing time varies with the contents of the data. Further, when the buffer memory is heavily accessed, the operating speed of each accessing system greatly varies with the access priority.

FIG. 19 is a timing chart for explaining the structure according to the prior art shown in FIG. 16, like in FIG. 18, and shows a behavior when the processing time corresponding to one block gets longer. In this case, FIG. 19 shows a state in which the processing of one block takes a time that is longer than the writing time corresponding thereto.

According to the prior art structure in which the clock control circuit 16 that generates an operation clock in accordance with the basic clock is stopped by the processing end signal 104 and activated by the writing completion signal 103, the clock operation is not changed by the writing completion signal 103 that is outputted before the processing end signal 104 and the operation clock is kept in the operating state, but unfavorably stopped by the processing end signal 104 that is outputted later. That is, the clock is stopped although the circuit is not in a waiting state but there are blocks which are to be successively processed, and further the clock is returned after waiting for the writing completion signal 103 for the next block to resume the processing. When the processing takes a long time, an address of a block to be written (hereinafter, referred to as a writing block address) and an address of a block to be processed (hereinafter, referred to as a processing block address) are away from each other, and the difference between these addresses cannot be recovered. Accordingly, the margin in the buffer memory is gradually reduced every time when the processing takes a longer time.

SUMMARY OF THE INVENTION

The present invention has for its object to provide a clock control type processor which can permit and accommodate a temporary delay in the processing operation as much as the memory area allows, also in such a system that the input rate, output rate and processing time are not fixed, to gain a margin for the input/output rate, as well as realize this accommodation of the delay in the processing operation while reducing a clock power consumption as much as possible.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a processor including: a storage means for storing inputted data; a writing means for writing the inputted data in the storage means; a processing means for reading the data which have been written in the storage means by the writing means, and subjecting the data to processing; a reading means for reading the data which have been subjected to the processing by the processing means, from the storage means; an address generation means for generating an address in the storage means for the writing means, the processing means, or the reading means to perform writing/reading into/from the storage means; a clock control means for performing control to switch between a normal state in which a clock signal is supplied to the processing means, and a sleep state in which the supply of the clock-signal is stopped; and a clock signal state switch means for controlling the clock control means to switch a state of the clock signal between the normal state and the sleep state, when the processing means finishes the processing and the address generation means turns into a predetermined state. Therefore, addresses for respective memory accesses corresponding to a writing block, a processing block, and a reading block are monitored, and the state of the clock that is supplied to the processing means is switched according to the states of the respective block addresses, whereby the buffer memory area can be effectively utilized and the power consumption can be reduced.

According to a 2nd aspect of the present invention, there is provided a processor including: a storage means for storing inputted data; a writing means for writing the inputted data in the storage means; a processing means for reading the data which have been written into the storage means by the writing means, and subjecting the data to processing; a reading means for reading the data which have been subjected to the processing by the processing means, from the storage means; an address generation means for generating an address in the storage means for the writing means, the processing means, or the reading means to perform writing/reading into/from the storage means; a flipflop control means for controlling a flipflop included in the processing means to switch between a hold state in which data are held in a loop including the flipflop, and a normal state in which data are inputted/outputted into/from the flipflop; and a hold control means for controlling the flipflop control means to switch a state of the flipflop between the normal state and the hold state, when the processing means finishes the processing and the address generation means turns into a predetermined state. Therefore, addresses for respective memory accesses corresponding to a writing block, a processing block, and a reading block are monitored, and the state of the flipflop in the processing means is switched according to the states of the respective block addresses, whereby the buffer memory area can be effectively utilized, and further clock skew adjustment with other blocks can be easily realized without providing a clock line with a gate circuit. In addition, the clock control can be equivalently performed by establishing the hold state, and the power consumption can be reduced by suppressing the switching of the circuit.

According to a 3rd aspect of the present invention, in the processor according to the 1st aspect, the clock signal state switch means switches the state of the clock signal to the normal state when the processing means finishes a processing of one block corresponding to a predetermined amount of the data and the address generation means turns into a first predetermined state. Therefore, the clock control can be performed so as to recover the delay in the progress of the processing operation.

According to a 4th aspect of the present invention, in the processor according to a 1st aspect, the clock signal state switch means switches the state of the clock signal to the sleep state when the processing means finishes a processing of one block corresponding to a predetermined amount of the data and the address generation means turns into a second predetermined state. Therefore, the clock signal is returned to a sleep state immediately when a delay in the progress of the processing operation is recovered, thereby to suppress the power consumption.

According to a 5th aspect of the present invention, in the processor of the 2nd aspect, the hold control means switches the state of the flipflop to the normal state when the processing means finishes a processing of one block corresponding to a predetermined amount of the data and the address generation means turns into a first predetermined state. Therefore, the clock control can be performed equivalently so as to recover a delay in the progress of the processing operation.

According to a 6th aspect of the present invention, in the processor of the 2nd aspect, the hold control means switches the state of the flipflop to the hold state when the processing means finishes a processing of one block corresponding to a predetermined amount of the data and the address generation means turns into a second predetermined state. Therefore, the flipflop is returned to a hold state immediately when a delay in the progress of the processing operation is recovered, thereby to suppress the power consumption.

According to a 7th aspect of the present invention, in the processor of the 1st aspect, the clock control means switches the state of the clock to the normal state when the processing means finishes a processing and a difference between an address in the storage means at which the processing has been finished and an address at which the writing means is performing writing has a first predetermined value. Therefore, the progress of the operation in the processing means with relative to the writing address is detected on the basis of the difference between the addresses, whereby the clock control can be performed with a simple hardware construction to recover a delay in the progress of the processing operation.

According to an 8th aspect of the present invention, in the processor of the 1st aspect, the clock control means switches the state of the clock to the sleep state when the processing means finishes a processing and a difference between an address in the storage means at which the processing has been finished and an address at which the writing means is performing writing has a second predetermined value. Therefore, the progress of the operation in the processing means with relative to the writing address is detected on the basis of the difference between the addresses, whereby the clock control can be performed with a simple hardware construction, and the clock signal is returned to a sleep state immediately when a delay in the progress of the processing operation is recovered, thereby suppressing the power consumption.

According to a 9th aspect of the present invention, in the processor of the 2nd aspect, the flipflop control means switches the state of the flipflop to the normal state when the processing means finishes a processing and a difference between an address in the storage means at which the processing has been finished and an address at which the writing means is performing writing has a first predetermined value. Therefore, the progress of the operation in the processing means with relative to the writing address is detected on the basis of the difference between the addresses, whereby the clock control is performed equivalently with a simple hardware construction to recover a delay in the progress of the processing operation.

According to a 10th aspect of the present invention, in the processor of the 2nd aspect, the flipflop control means switches the state of the flipflop to the hold state when the processing means finishes a processing and a difference between an address in the storage means at which the processing has been finished and an address at which the writing means is performing writing has a second predetermined value. Therefore, the progress in the operation of the processing means with relative to the writing address is detected on the basis of the difference between the addresses, whereby the clock control can be performed equivalently with a simple hardware construction, and the flipflop is returned to a state having a hold state immediately when a delay in the progress of the processing operation is recovered, thereby suppressing the power consumption.

According to an 11th aspect of the present invention, in the processor of the 1st aspect, the clock control means switches the state of the clock to the normal state when the processing means finishes a processing and a difference between an address in the storage means at which the processing has been finished and an address at which the reading means is performing reading has a first predetermined value. Therefore, the progress of the operation in the processing means with relative to the reading address is detected on the basis of the difference between the addresses, whereby the clock control can be performed with a simple hardware construction to recover a delay in the progress of the processing operation.

According to a 12th aspect of the present invention, in the processor of the 1st aspect, the clock control means switches the state of the clock to the sleep state when the processing means finishes a processing and a difference between an address in the storage means at which the processing has been finished and an address at which the reading means is perform reading has a second predetermined value. Therefore, the progress in the operation of the processing means with relative to the reading address is detected on the basis of a difference between addresses, whereby the clock signal is returned to a sleep state by a simple hardware construction immediately when a delay in the progress of the processing operation is recovered, thereby suppressing the power consumption.

According to a 13th aspect of the present invention, in the processor of the 2nd aspect, the flipflop control means switches the state of the flipflop to the normal state when the processing means finishes a processing and an difference between an address in the storage means at which the processing has been finished and an address at which the reading means is performing reading has a first predetermined value. Therefore, the progress of the operation by the processing means with relative to the reading address is detected on the basis of the difference between the addresses, whereby the clock control can be performed equivalently with a simple hardware construction to recover a delay in the progress of the processing operation.

According to a 14th aspect of the present invention, in the processor of the 2nd aspect, the flipflop control means switches the state of the flipflop to the hold state when the processing means finishes a processing and a difference between an address in the storage means at which the processing has been finished and an address at which the reading means is performing reading has a second predetermined value. Therefore, the progress of the operation in the processing means with relative to the reading address is detected on the basis of the difference between the addresses, whereby the clock control can be performed equivalently with a simple hardware construction, and the flipflop is returned to a hold state immediately when a delay in the progress of the processing operation is recovered, thereby suppressing the power consumption.

According to a 15th aspect of the present invention, in the processor of the 7th aspect, addresses are allocated to the storage means in units of storage areas each storing a block corresponding to a predetermined amount of the data which is subjected to the processing by the processing means, and the clock control means switches the state of the clock to the normal state when the processing means finishes the processing and a difference between an address at which the processing has been finished and an address at which the writing means is performing writing has a value exceeding one block. Therefore, the progress of the operation by the processing means with relative to the writing address is detected on the basis of the difference between the addresses, whereby the clock control can be performed with a simple hardware construction to recover a delay in the progress of the processing operation.

According to a 16th aspect of the present invention, in the processor of the 8th aspect, addresses are allocated to the storage means in units of storage areas each storing a block corresponding to a predetermined amount of the data which is subjected to the processing by the processing means, and the clock control means switches the state of the clock to the sleep state when the processing means finishes the processing and a difference between an address at which the processing has been finished and an address at which the writing means is performing writing has a value corresponding to one block. Therefore, the progress of the operation by the processing means with relative to the writing address is detected on the basis of the difference between the addresses, whereby the clock control can be performed with a simple hardware construction, and the clock signal is returned to a sleep state immediately when a delay in the progress of the processing operation is recovered, thereby suppressing the power consumption.

According to a 17th aspect of the present invention, in the processor of the 9th aspect, addresses are allocated to the storage means in units of storage areas each storing a block corresponding to a predetermined amount of the data which is subjected to the processing by the processing means, and the flipflop control means switches the state of the flipflop to the normal state when the processing means finishes the processing and a difference between an address at which the processing has been finished and an address at which the writing means is performing writing has a value exceeding one block. Therefore, the progress of the operation in the processing means with relative to the writing address is detected on the basis of the difference between the addresses, whereby the clock control can be performed equivalently with a simple hardware construction to recover a delay in the progress of the processing operation.

According to an 18th aspect of the present invention, in the processor of the 10th aspect, addresses are allocated to the storage means in units of storage areas each storing a block corresponding to a predetermined amount of the data which is subjected to the processing by the processing means, and the flipflop control means switches the state of the flipflop to the hold state when the processing means finishes the processing and a difference between an address at which the processing has been finished and an address at which the writing means is performing writing has a value corresponding to one block. Therefore, the progress of the operation by the processing means with relative to the writing address is detected on the basis of the difference between the addresses, the clock control can be performed equivalently with a simple hardware construction, and the flipflop is returned to a hold state immediately when the delay in the progress of the processing operation is recovered, thereby suppressing the power consumption.

According to a 19th aspect of the present invention, in the processor of the 11th aspect, addresses are allocated to the storage means in units of storage areas each storing a block corresponding to a predetermined amount of the data which is subjected to the processing by the processing means, and the clock control means switches the state of the clock to the normal state when the processing means finishes the processing and a difference between an address at which the processing has been finished and an address at which the reading means is performing reading has a value exceeding one block. Therefore, the progress of the operation by the processing means with relative to the reading address is detected on the basis of the difference between the addresses, whereby the clock control can be performed with a simple hardware construction to recover a delay in the progress of the processing operation.

According to a 20th aspect of the present invention, in the processor of the 12th aspect, addresses are allocated to the storage means in units of storage areas each storing a block corresponding to a predetermined amount of the data which is subjected to the processing by the processing means, and the clock control means switches the state of the clock to the sleep state when the processing means finishes the processing and a difference between an address at which the processing has been finished and an address at which the reading means is performing reading has a value corresponding to one block. Therefore, the progress of the operation by the processing means with relative to the reading address is detected on the basis of the difference between the addresses, whereby the clock control can be performed with a simple hardware construction, and the clock signal is returned to a sleep state immediately when a delay in the progress of the processing operation is recovered, thereby suppressing the power consumption.

According to a 21st aspect of the present invention, in the processor of the 13th aspect, addresses are allocated to the storage means in units of storage areas each storing a block corresponding to a predetermined amount of the data which is subjected to the processing by the processing means, and the flipflop control means switches the state of the flipflop to the normal state when the processing means finishes the processing and a difference between an address at which the processing has been finished and an address at which the reading means is performing reading has a value exceeding one block. Therefore, the progress of the operation by the processing means with relative to the reading address is detected on the basis of the difference between the addresses, whereby the clock control can be performed equivalently with a simple hardware construction to recover a delay in the progress of the processing operation.

According to a 22nd aspect of the present invention, in the processor of the 14th aspect, addresses are allocated to the storage means in units of storage areas each storing a block corresponding to a predetermined amount of the data which is subjected to the processing by the processing means, and the flipflop control means switches the state of the flipflop to the hold state when the processing means finishes the processing and a difference between an address at which the processing has been finished and an address at which the reading means is performing reading has a value corresponding to one block. Therefore, the progress of the operation by the processing means with relative to the reading address is detected on the basis of the difference between the addresses, whereby the clock control can be performed equivalently with a simple hardware construction, and the flipflop is returned to a hold state immediately when a delay in the progress of the processing operation is recovered, thereby suppressing the power consumption.

According to a 23rd aspect of the present invention, in the processor of the 1st aspect, the sleep state of the clock signal is a state in which the clock signal is completely stopped. Therefore, the power consumption can be greatly reduced.

According to a 24th aspect of the present invention, in the processor of the 1st aspect, the sleep state of the clock signal is not a state in which the supply of the clock signal is stopped but a state in which a clock frequency is reduced to a frequency that is lower than a clock frequency of the normal state. Therefore, the power consumption can be reduced.

According to a 25th aspect of the present invention, in the processor of the 1st aspect, the clock signal state switch means executes the switching of the state so that the clock control means shifts to the sleep state in accordance with an AND signal between a processing end signal from the processing means and a control signal from the address generation means, and the writing means returns to a normal operation at a signal indicating that a writing operation corresponding to one block has been completed. Therefore, the buffer memory area can be effectively utilized and the power consumption can be reduced, as well as the switching of the state in the clock control means is performed in accordance with a signal that is generated by the above-mentioned circuit construction, whereby the clock control can be automatically performed without requiring an access by an external microcomputer.

According to a 26th aspect of the present invention, in the processor of the 2nd aspect, the hold control means executes the switching of the state so that the flipflop control means shifts to the hold state in accordance with an AND signal between a processing end signal from the processing means and a control signal from the address generation means, and the writing means returns to a normal operation at a signal indicating that a writing operation corresponding to one block has been completed. Therefore, the buffer memory area can be effectively utilized, and the clock skew adjustment with other blocks can be easily realized without providing a clock line with a gate circuit. Further, the clock control can be performed equivalently by establishing the hold state, and the power consumption can be reduced by suppressing the switching of the circuit, as well as the switching of the state in the hold control means is performed in accordance with the signal that is generated by the above-mentioned circuit construction, whereby the clock control can be automatically performed without requiring an access by an external microcomputer.

According to a 27th aspect of the present invention, in the processor of the 1st aspect, the clock signal state switch means executes the switching of the state so that the clock control means shifts to the sleep state in accordance with an AND signal between a processing end signal from the processing means and a control signal from the address generation means, and the reading means returns to a normal operation at a signal indicating that a reading operation corresponding to one block has been completed. Therefore, the clock control can be performed automatically without requiring an access by an external microcomputer, as well as the buffer memory area can be effectively utilized, and the power consumption can be reduced.

According to a 28th aspect of the present invention, in the processor of the 2nd aspect, the hold control means executes the switching of the state so that the flipflop control means shifts to the hold state in accordance with an AND signal between a processing end signal from the processing means and a control signal from the address generation means, and the reading means returns to a normal operation at a signal indicating that a reading operation corresponding to one block has been completed. Therefore, the clock control can be automatically performed equivalently without requiring an access by an external microcomputer. Further, the buffer memory area can be effectively utilized, and the clock skew adjustment with other blocks can be easily realized without providing the clock line with a gate circuit, as well as the clock control can be equivalently performed by establishing the hold state, and the power consumption can be reduced by suppressing the switching of the circuit.

According to a 29th aspect of the present invention, in the processor of the 1st aspect, the clock control means can control the switching of the state in accordance with a processing permission signal that is inputted from outside. Therefore, normal clock operation can be minimized by turning the clock into a sleep state except when specific blocks are subjected to processing, whereby the buffer memory area can be effectively utilized and the power consumption can be reduced.

According to a 30th aspect of the present invention, in the processor of the 2nd aspect, the flipflop control means can control the switching of the state in accordance with a processing permission signal that is inputted from outside. Therefore, the normal clock operation can be minimized by equivalently turning the clock into a sleep state except when specific blocks are subjected to processing.

DETAILED DESCRIPTION OF THE PREFERRED EMBODIMENTS

[Embodiment 1]

According to a first embodiment of the present invention, a temporary delay in a processing operation is permitted and accommodated in a system in which the processing time is not constant, and a margin for an input/output rate can be gained.

Further, when some measures are taken to overcome the above-mentioned delay in the processing operation, it is impossible to simply stop the operation clock for the processing circuit with respect to all blocks to reduce the power consumption as in the prior art, and the number of stops of the clock supply must be reduced. According to the first embodiment, an increase in the power consumption can be suppressed to the utmost by taking these measures, and a state in which a less power is consumed can be maintained as long as possible.

A clock control type processor according to the first embodiment, corresponding to claims 1, 3, 4, 7, 8, 15, 16, 23, 24, 25, and 27, will be described.

Figure 1:
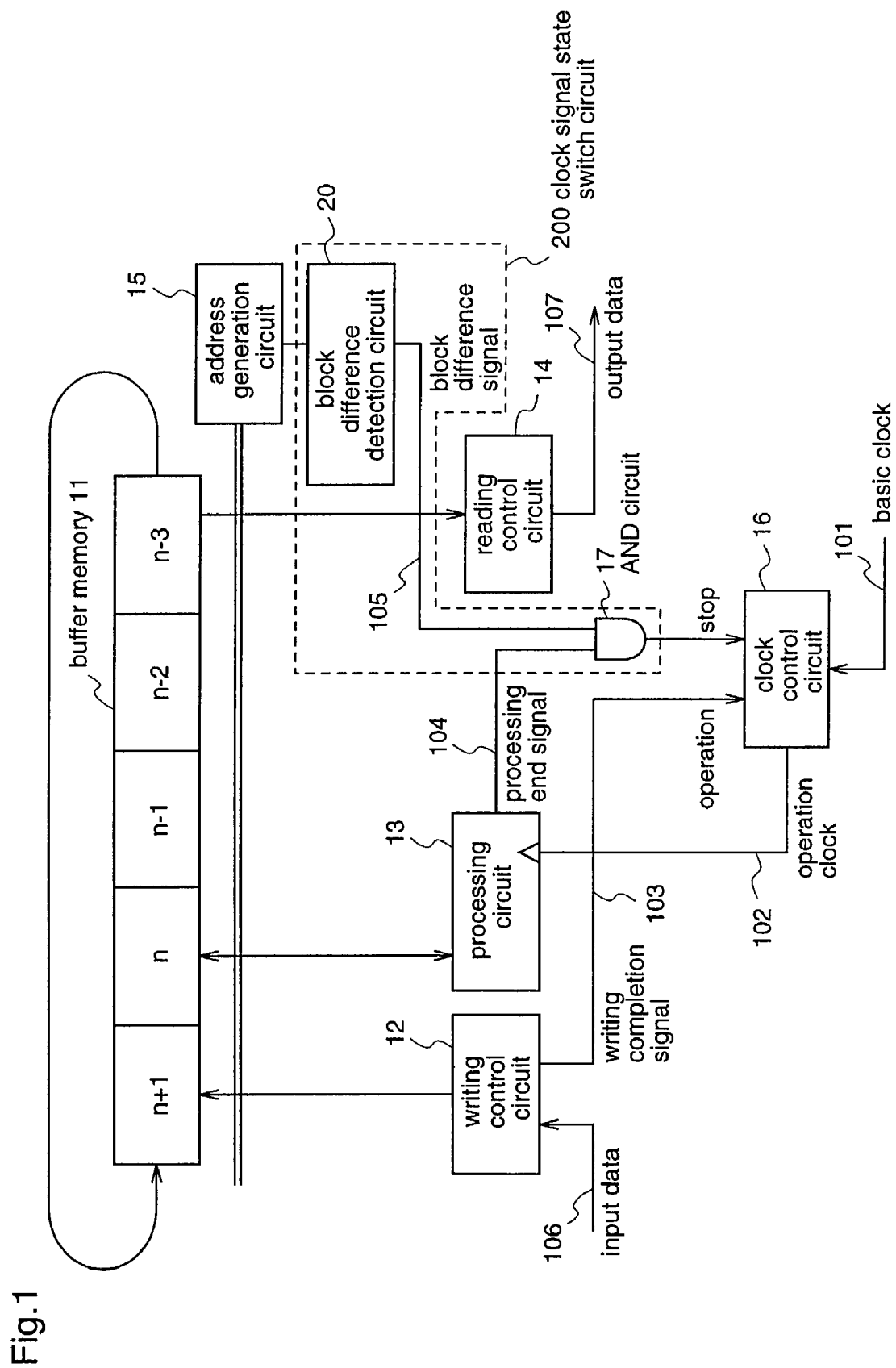
FIG. 1 is a block diagram illustrating an example of a clock control type processor according to a first embodiment of the present invention.
Figure 16:
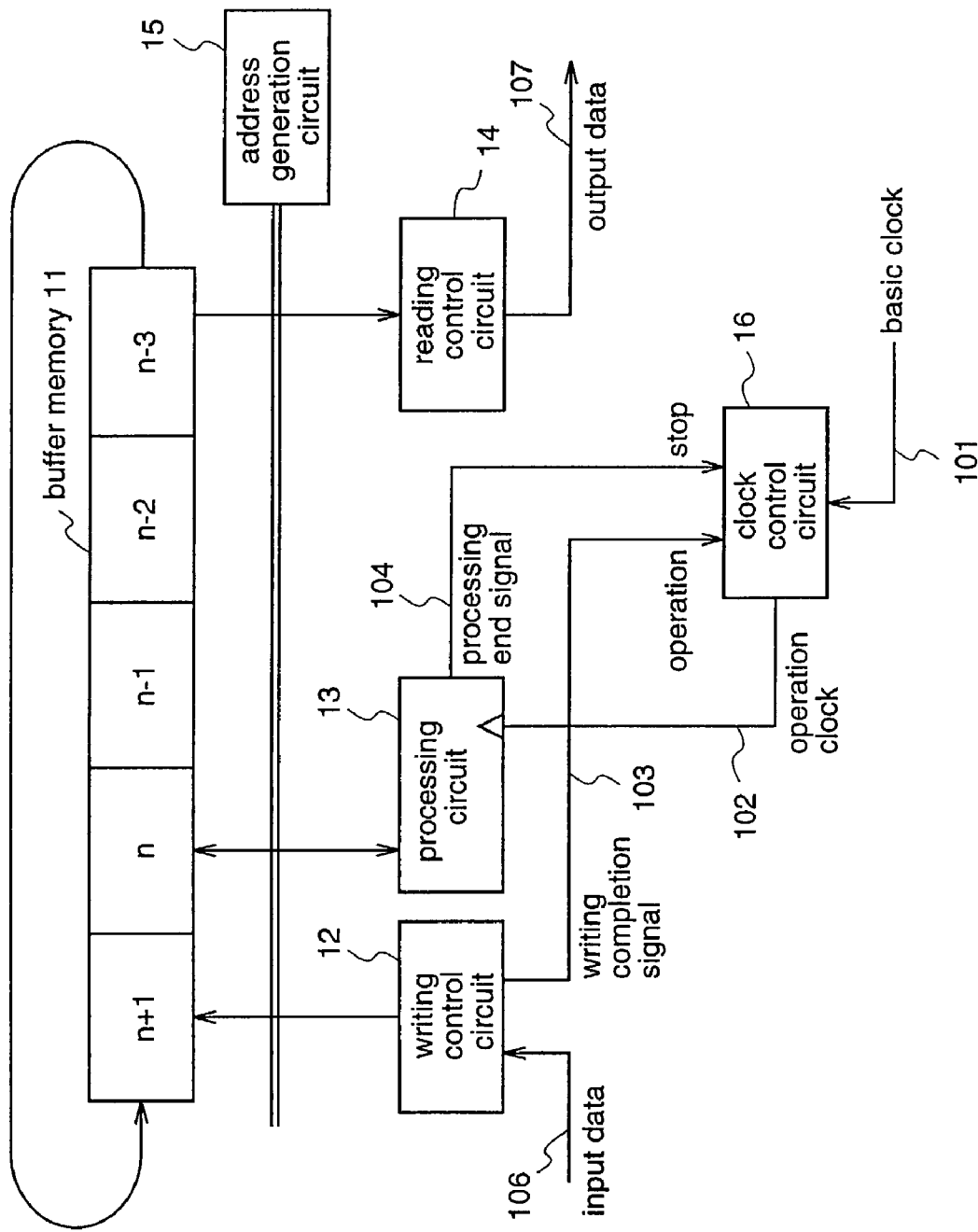
FIG. 16 is a block diagram illustrating an example of a conventional clock control type processor.

FIG. 1 is a block diagram illustrating an example of the clock control type processor according to the first embodiment. This processor is explained as an example of the operation system that temporarily stores data in a buffer memory to perform processing, as in the prior art shown in FIG. 16.

Figure 17:
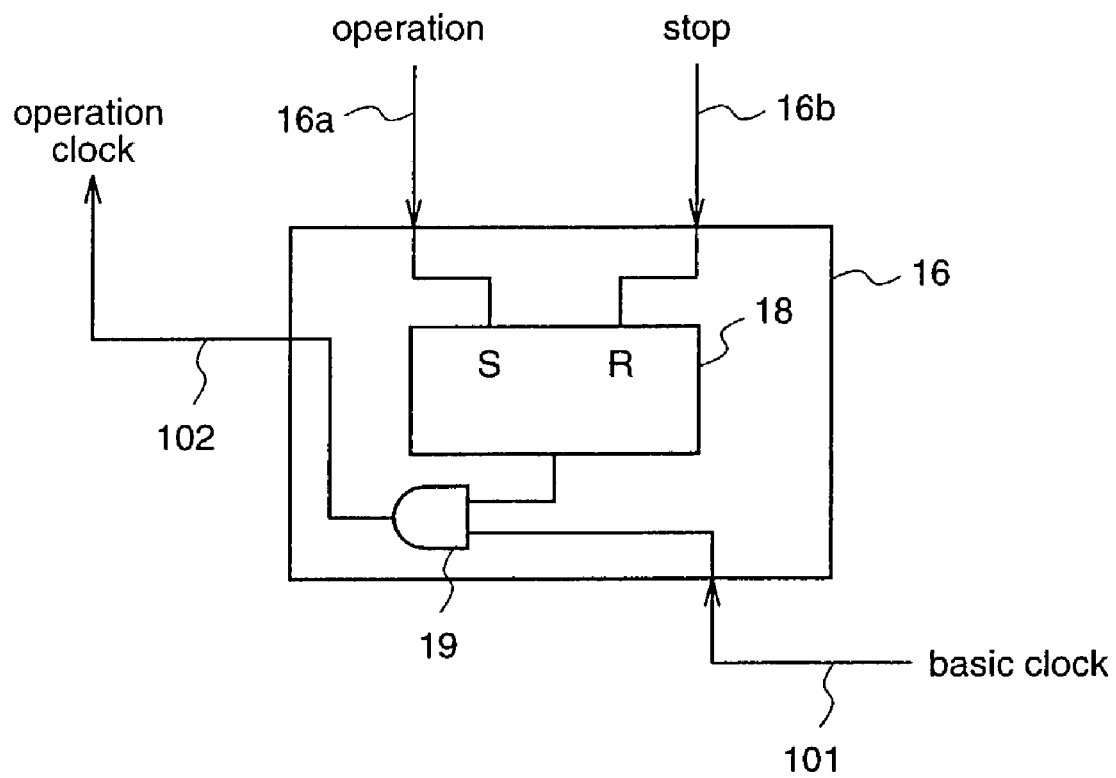
FIG. 17 is a diagram specifically illustrating a clock control circuit shown in FIG. 16.
Figure 18:
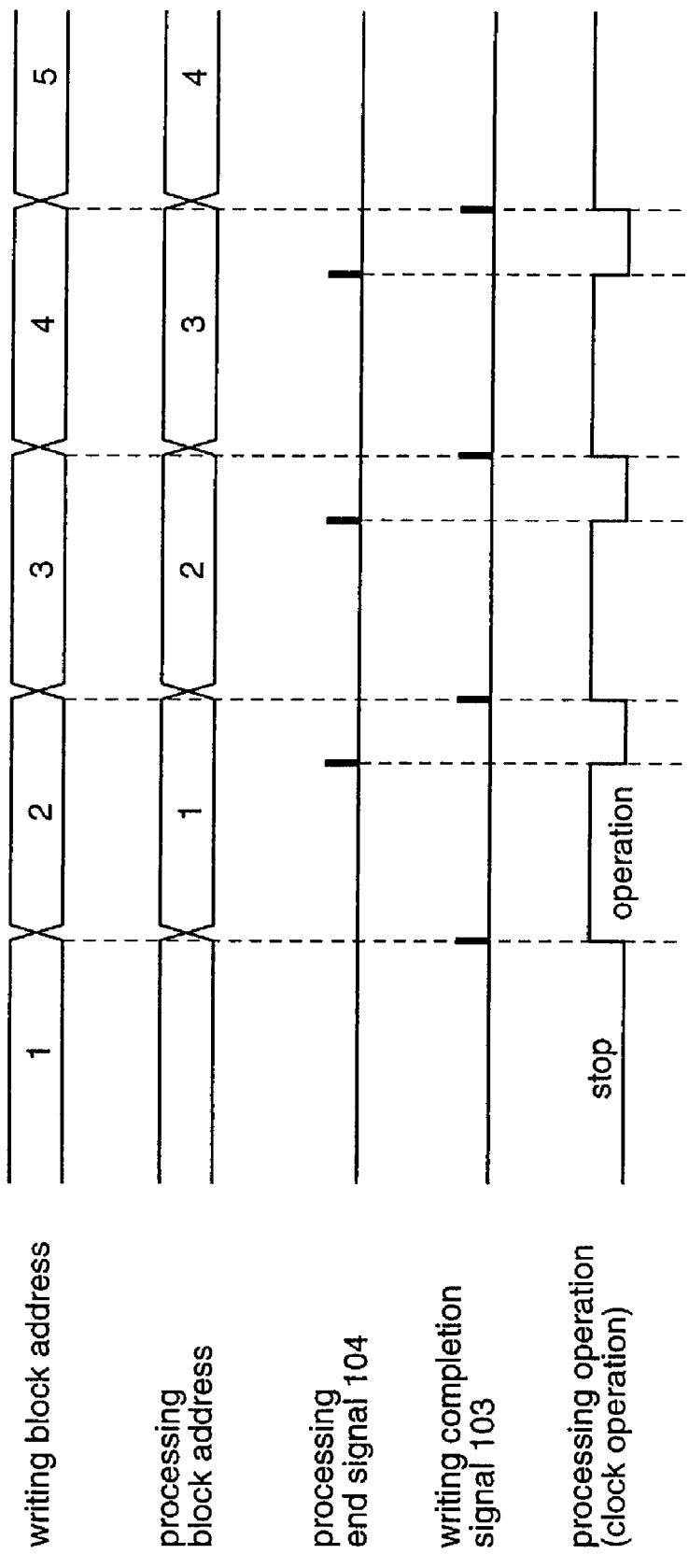
FIG. 18 is a timing chart showing an operation of the clock control type processor shown in FIG. 16.
Figure 19:
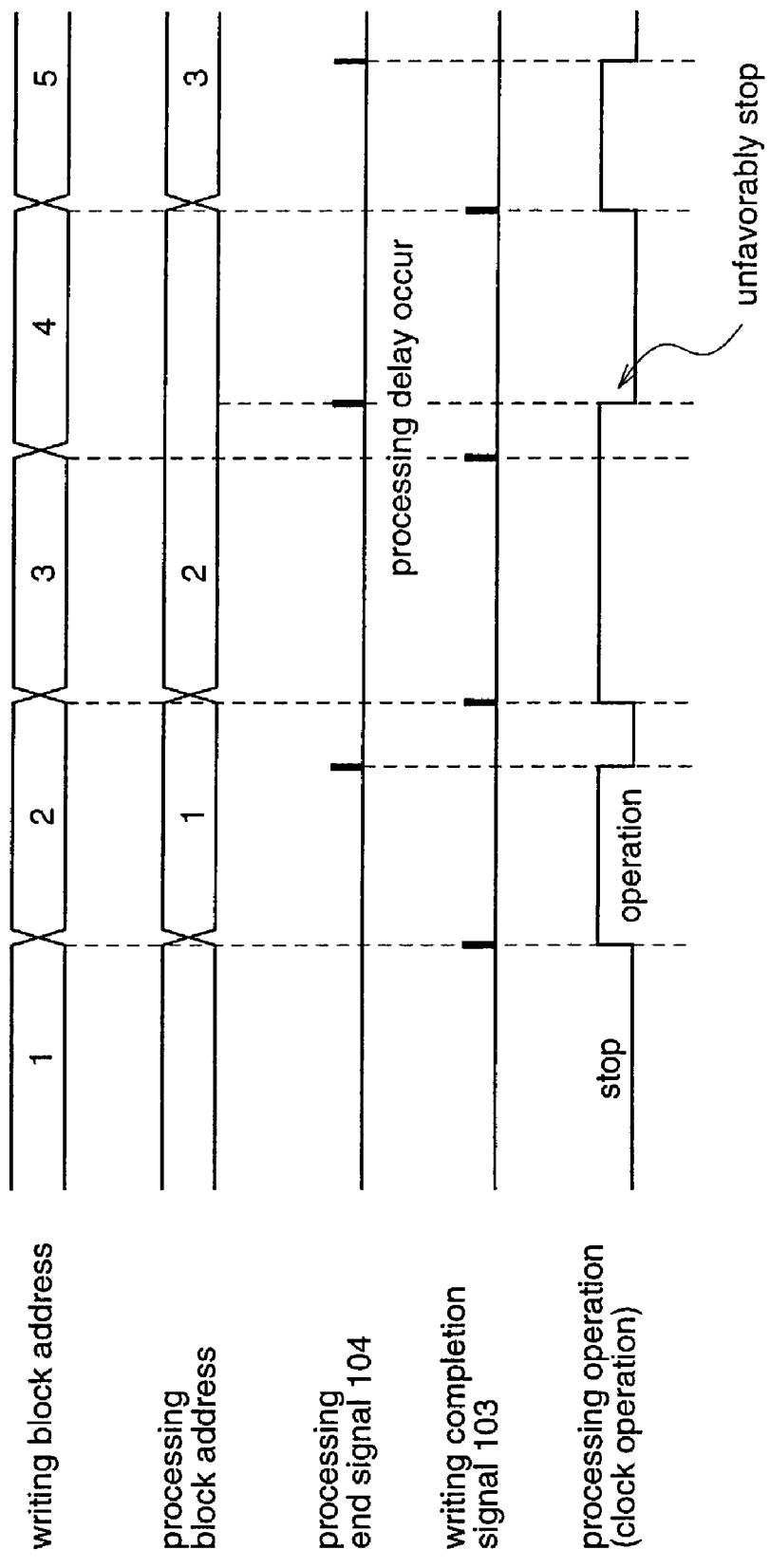
FIG. 19 is a timing chart showing an operation of the clock control type processor shown in FIG. 16, in a case where a processing delay occurs.

In FIG. 1, a buffer memory (storage means) 11 is constituted by a high-capacity memory element such as a DRAM. The buffer memory 11 is divided into areas each corresponding to a block which is subjected to processing, and one address is allocated to one block. There are three kinds of operations in which accesses to the buffer memory are made, i.e., a writing operation, a processing operation, and a reading operation. The accesses are made by a writing control circuit (writing means) 12, a processing circuit (processing means) 13, and a reading control circuit (reading means) 14, respectively. An address generation circuit (address generation means) 15 controls addresses at which these accessing systems makes access to the buffer memory 11, respectively, to perform control for avoiding an overflow and underflow in the buffer memory 11, as well as makes the buffer memory 11 carry out a ring operation. In this ring operation for example, the address is successively incremented by "1" from the minimum value "0", then returned to "0" after reaching to the maximum value "n+1" (n is 0 or a positive integer), and thereafter the same operation is repeated. A block difference detection circuit 20 detects a difference between a writing block address and a processing block address which are controlled by the address generation circuit 15, and outputs a block difference signal 105 on the basis of the detected address difference. An AND circuit 17 generates an AND signal between the block difference signal 105 and a processing end signal 104, and constitutes together with the block difference detection circuit 20 a clock signal state switch circuit (clock signal state switch means) 200 which controls a clock control circuit 16 for switching the clock state between a normal state and a sleep state. It is assumed that the clock control circuit (clock control means) 16 has a basic structure that is the same as that shown in FIG. 17. The clock control circuit 16 generates an operation clock 102 for the processing circuit 13 under the control of the basic clock 101. This clock control circuit 16 can activate the operation clock 102 in accordance with the writing completion signal 103 from the writing control circuit 12, and stop the operation clock 102 in accordance with the AND signal between the processing end signal 104 from the processing circuit 13 and the block difference signal 105 from the block difference detection circuit 20, which is obtained by the AND circuit 17.

Figure 2:
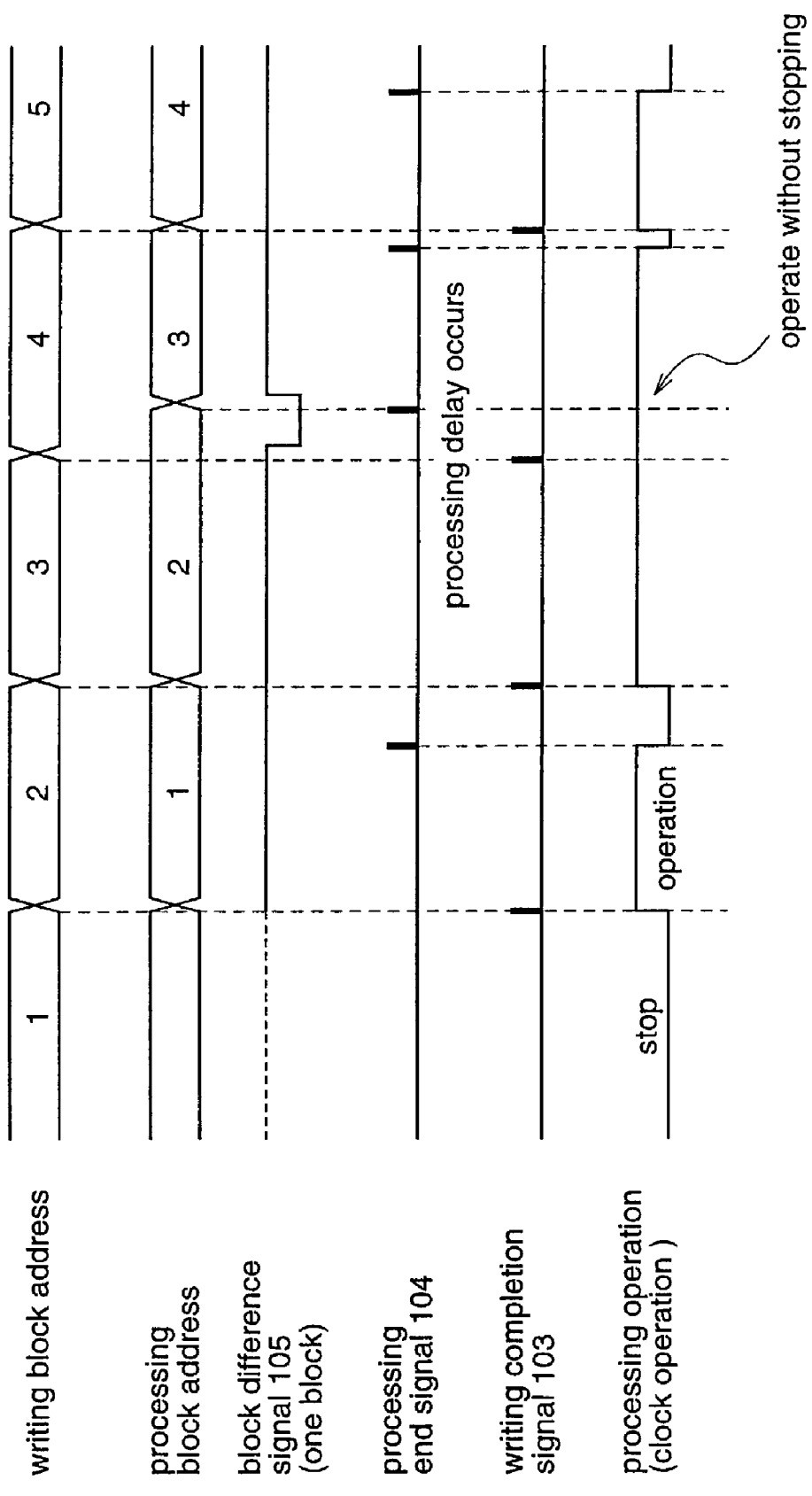
FIG. 2 is a timing chart showing an operation of the clock control type processor shown in FIG. 1.

FIG. 2 is a timing chart showing an operation of the clock control type processor according to the first embodiment, as shown in FIG. 1, and shows a behavior in a case where a processing time corresponding to a certain block gets longer. In this case, FIG. 2 shows a state in which the processing of one block takes a longer time than its writing time.

In the conventional clock control operation, the clock operation is stopped in accordance with the processing end signal 104. However, when the processing operation is delayed with respect to the writing operation, it is required to continue the clock operation to perform processing continuously for the next block whose writing has been already completed.

In the first embodiment, the difference between the writing block address and the processing block address is detected by the block difference detection circuit 20, thereby deciding whether the clock is to be stopped or not at the end of the processing corresponding to one block. In the case of the circuit structure described in the first embodiment, when the difference is larger than one block, the clock operation is not stopped to uninterruptedly continue the processing for the next block whose writing has been already completed.

More specifically, in the case shown in FIG. 2, the block difference detection circuit 20 outputs "H level" of the block difference signal 105 when the difference between the writing block address and the processing block address is "1" (a second predetermined state, a second predetermined value).

On the other hand, the block difference signal 105 turns to "L level" in an area where the output of the processing end signal 104 is delayed so that the difference between addresses turns to "2" (a first predetermined state, a first predetermined value).

In the case shown in FIG. 2, the block difference signal 105 remains "L level" until the processing block address increases from "2" to "3" after the writing block address has increased from "3" to "4".

Thereby, the AND circuit 17 stops the processing end signal 104 from the processing circuit 13 being inputted to the clock control circuit 16 as its stop signal, and then the clock control circuit 16 passes through the basic clock 101 as it is to supply the same to the processing circuit 13 as an operation clock. As a result, the processing circuit 13 can continue processing for a block at the next processing block address "3" whose writing has been already completed, subsequently to the processing block address "2".

When a premise that the processing time in the processing circuit 13 for the block at the processing block address "3" is shorter than the writing time for one block is met and the processing end signal 104 is generated before the writing completion signal 103, the block difference detection circuit 20 outputs "H level" of the block difference signal 105, the AND circuit 17 supplies the clock control circuit 16 with the processing end signal 104, and then the clock control circuit 16 outputs the basic clock 101 to the processing circuit 13 as the operation clock 102.

The clock control type processor according to the first embodiment detects a difference between a writing block address and a processing block address, thereby continuing the clock operation when the processing operation is delayed with respect to the writing operation, to continuously perform a processing operation for the next block whose writing has already been completed, whereby an temporary delay in the processing operation can be permitted and accommodated to obtain a margin for the input/output rate. When the temporary delay in the processing operation is accommodated as described above, the processor immediately returns to a state having the normal operation, i.e., an operation in which the clock control circuit 16 passes through the basic clock 101 in accordance with the writing completion signal 103 from the writing control circuit 12 to supply the clock to the processing circuit 13 as the operation clock, then the clock control circuit 16 interrupts the basic clock 101 in accordance with the processing end signal 104 from the processing circuit 13 to stop the supply of the operation clock 102, thereby stopping the processing circuit 13, and the processing circuit 13 stays in a waiting state until writing of the next block is completed while stopping the operation clock 102 to reduce the power consumption. Therefore, it is possible to minimize an increase in the power consumption resulting from an increase in a period during which the operation clock cannot be stopped because a temporary delay in the processing operation is accommodated.

In addition, when the processing circuit 13 finishes a processing corresponding to one block, the clock control can be performed on the basis of the state of the address generation circuit 15 while monitoring the progress of the processing operation.

Further, the progress of the operation in the processing circuit 13 with relative to the writing address can be detected on the basis of the difference between addresses, whereby the clock control can be performed with a simple hardware structure.

Further, only with the simple hardware construction, the state of the processing circuit 13 waiting for the completion of the writing corresponding to the next block can be detected as the address difference of one block, and switched to a sleep state in which the supply of the clock is stopped.

Further, as the clock can be completely stopped to suppress the operation of the processing circuit 13 during a processing operation stop period of the processing circuit 13, the power consumption can be greatly reduced by completely stopping the clock as a sleep state.

The clock control circuit 16 according to the first embodiment completely stops the clock as the sleep state, while this circuit may lower the frequency of the clock as a sleep state as defined in claim 24. In this case, when there is a circuit which requires any operation also in the processing operation stop period of the processing circuit 13 and this operation can be realized even when the clock frequency is lowered in this period, the power consumption can be reduced as in the case where the clock is stopped.

[Embodiment 2]

A clock control type processor according to a second embodiment, corresponding to claims 2, 5, 6, 9, 10, 17, 18, 26, and 28, will be described.

Figure 3:
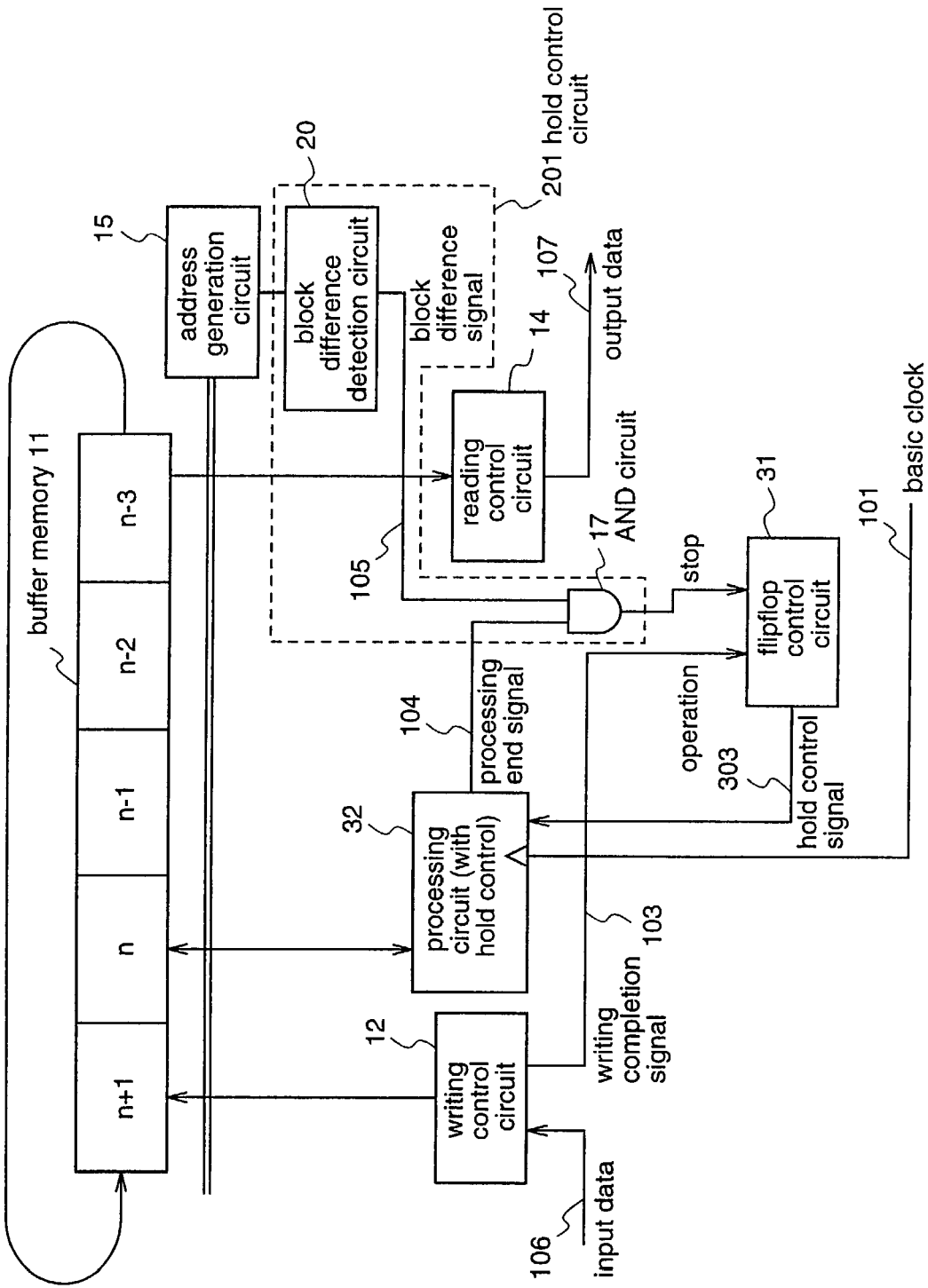
FIG. 3 is a block diagram illustrating an example of a clock control type processor according to a second embodiment of the present invention.

FIG. 3 is a block diagram illustrating an example of the clock control type processor according to the second embodiment. This processor will be described as an example of the operation system that temporarily stores data in a buffer memory to carry out processing as in the first embodiment described with reference to FIG. 1. A buffer memory 11, a writing control circuit 12, an address generation circuit 15, and a block difference detection circuit 20 are the same as those in the clock control type processor according to the first embodiment. Numeral 31 denotes a flipflop control circuit (flipflop control means), and numeral 32 denotes a processing circuit (processing means) that can perform a hold control over a D-flipflop included in an internal combinatorial circuit under the control of the flipflop control circuit 31. A basic clock 101 is directly inputted to the processing circuit 32, unlike the processing circuit 13 shown in FIG. 1. A hold control circuit (hold control means) 201 controls the flipflop control circuit 31 for switching the state of the D-flipflop with a hold function included in the processing circuit 32, between a normal state and a hold state. This hold control circuit 201 is constituted, like the clock signal state switch circuit 200 shown in FIG. 1, by a block difference detection circuit 20 and the AND circuit 17, and outputs an AND signal between a block difference signal 105 and a processing end signal 104 to the flipflop control circuit 31 as a stop signal.

Figure 4:
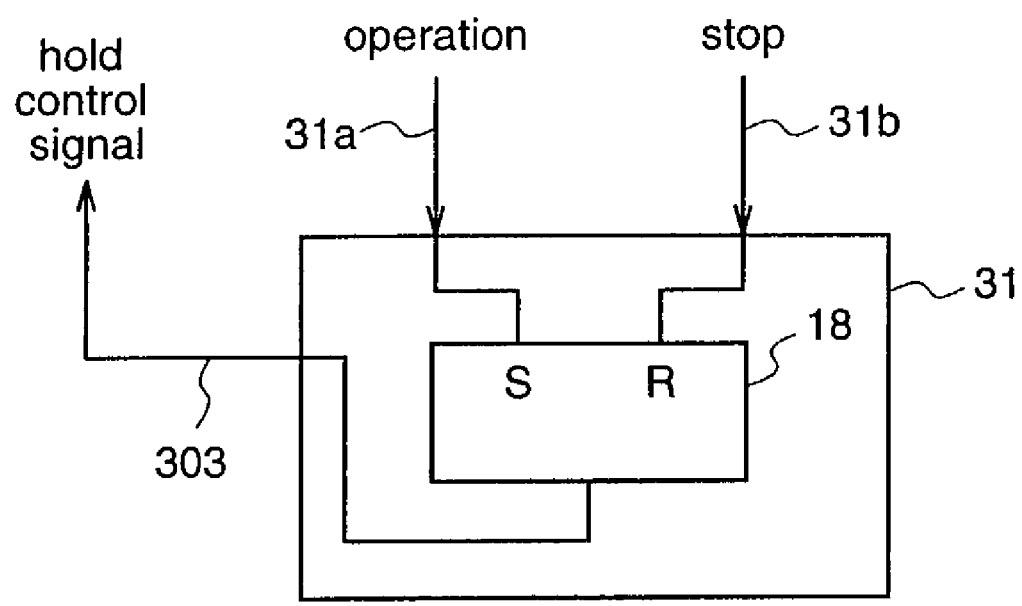
FIG. 4 is a diagram specifically illustrating a clock control circuit shown in FIG. 3.

FIG. 4 is a diagram specifically illustrating the flipflop control circuit 31 shown in FIG. 3. The writing completion signal 103 and the AND signal from the AND circuit 17 are inputted to an S input and a R input of a R-S flipflop 18 in the flipflop control circuit 31, as an operation signal 31a and a stop signal 31b, respectively. When this R-S flipflop 18 gets into a reset state in accordance with the AND signal, a hold control signal 303 is outputted.

Figure 5A:
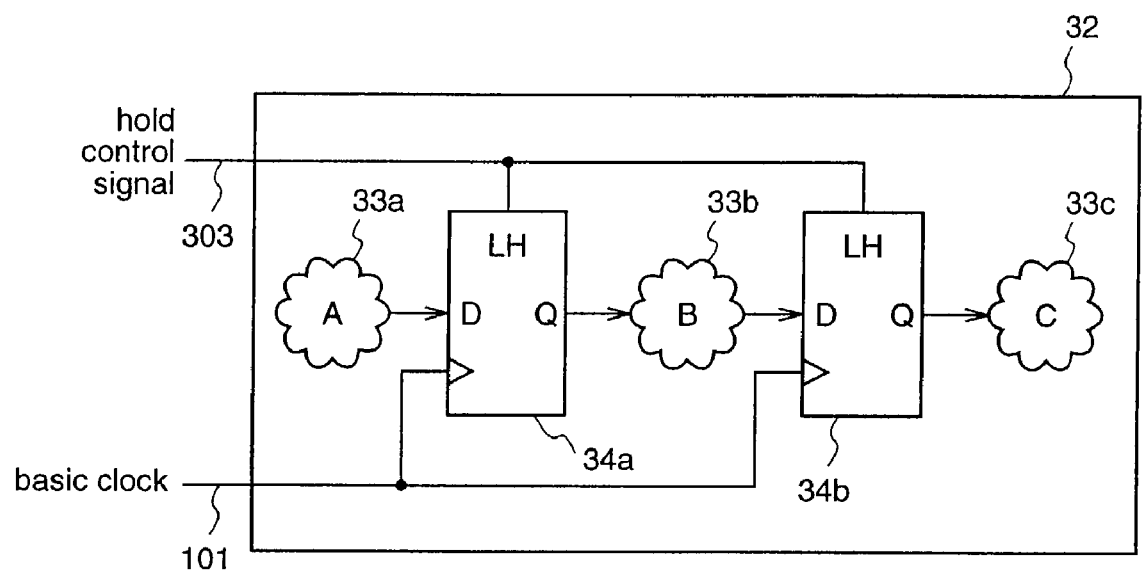
FIG. 5(*a*) is a diagram specifically illustrating a processing circuit shown in FIG. 3, and FIG. 5(*b*) is a diagram specifically illustrating a D-flipflop circuit included in the processing circuit.
Figure 5B:
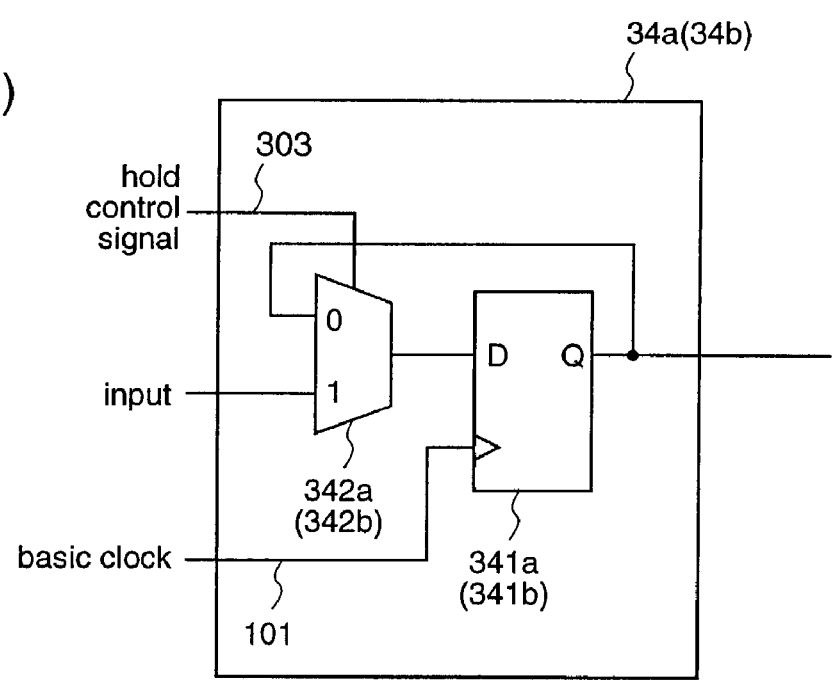

FIG. 5 are diagrams specifically illustrating the structures of the processing circuit 32 as shown in FIG. 3 (FIG. 5(a)), and a D-flipflop 34a (34b) (FIG. 5(b)) included in the processing circuit 32. The numbers of the combinatorial circuits and the D-flipflops with hold function in FIG. 5 are only exemplary.

In FIG. 5, the processing circuit 32 includes plural combinatorial circuits 33a, 33b and 33c, and plural D-flipflops with hold function 34a and 34b. The D-flipflop with hold function 34a (34b) is constituted by a D-flipflop 341a (341b) and a selector 342a (342b), and the hold control signal 303 performs hold control over the D-flipflop with hold function 34a (34b). More specifically, the hold control signal 303 performs control for switching the selector 342a (342b) in the D-flipflop with hold function 34a (34b) to select an input to the D-flipflop with hold function 341a (341b) when the signal value is "1", while selecting an output Q of the D-flipflop 341a (341b) when the signal value is "0". As the output of the selector 342a (342b) is connected to the input D of the D-flipflop 341a (341b), a loop is formed between the D-flipflop 341a (341b) and the selector 342a (342b) by setting the value of the hold control signal 303 at "0", to hold the data.

Figure 6:
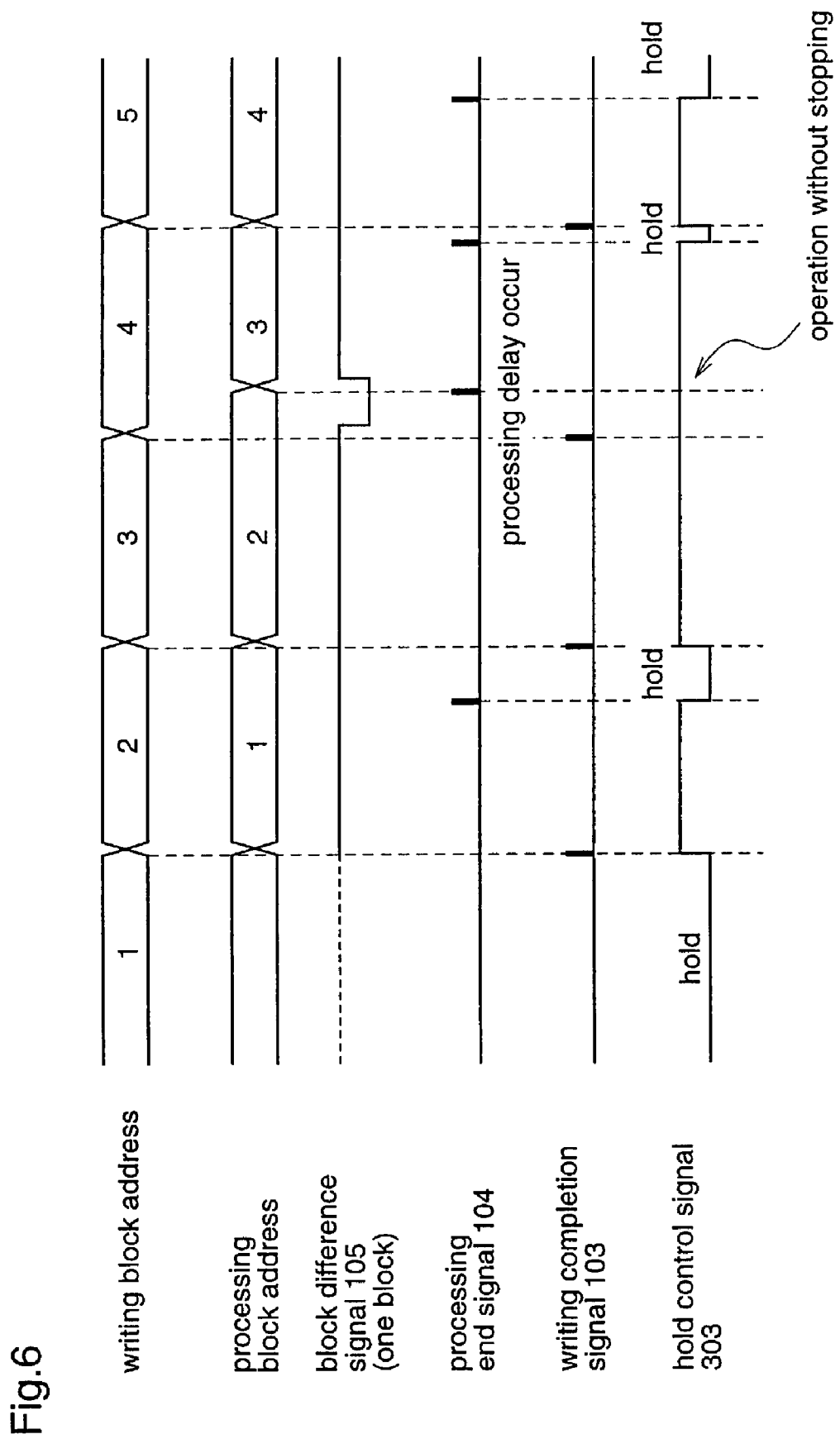
FIG. 6 is a timing chart showing an operation of the clock control type processor as shown in FIG. 3.

FIG. 6 is a timing chart for explaining the operation of the clock control type processor according to the second embodiment, as shown in FIG. 3, and this figure shows a behavior of the processor when a processing time corresponding to a certain block gets longer. In the second embodiment corresponding to claim 2, the block difference detection circuit 20 detects a difference between the writing block address and the processing block address, thereby deciding whether the clock is to be stopped or not at the end of the processing corresponding to one block. In the circuit structure as described in the second embodiment, when the difference is larger than one block, the clock operation is not stopped but processing for the next block whose writing has already been completed can be continued uninterruptedly in accordance with the hold control signal 303.

The clock control type processor according to the second embodiment detects a difference between a writing block address and a processing block address, to turn the D-flipflop in the processing circuit into a non-hold state when the processing operation is delayed with respect to the writing operation, thereby equivalently continuing the clock operation to continuously perform processing for the next block whose writing has already been completed. Thereby, a temporary delay in the processing operation can be permitted and accommodated, and a margin for the input/output rate can be gained. When the temporary delay in the processing operation is accommodated as described above, the processor immediately returns to a state having the normal operation, i.e., an operation in which the flipflop control circuit 31 turns the D-flipflop into a non-hold state in accordance with the writing completion signal 103 from the writing control circuit 12 to make the processing circuit 32 operate, then the flipflop control circuit 31 turns the D-flipflop into a hold state in accordance with the processing end signal 104 from the processing circuit 32 to stop the processing circuit 32, and the processing circuit 32 keeps a waiting state until writing of the next block is completed while maintaining the hold state, to reduce the power consumption. Therefore, it is possible to minimize an increase in the power consumption resulting from an increase in a period during which the hold state cannot be established because a temporary delay in the processing operation is accommodated, i.e., a period corresponding to the period during which the operation clock cannot be stopped.

In order to reduce the power consumption, the clock control circuit according to the first embodiment switches the state of the clock itself which is supplied to the processing circuit, in the sleep state. However, in this second embodiment, the flipflop in the processing circuit is subjected to hold control to suppress the operation of the circuit during the processing stop period, thereby equivalently performing the clock control. When the flipflop is turned into a data holding state, a clock skew adjustment with other blocks can be easily performed without providing a clock line with a gate circuit, and when the data holding state is established to suppress the switching of the circuit, the power consumption can be reduced as in an example corresponding to claim 23 or 24.

In addition, when the processing circuit 32 finishes processing corresponding to one block, the clock control can be performed on the basis of the state of the address generation circuit 15 while monitoring the progress of the processing operation.

Further, the progress of the operation in the processing circuit 32 with relative to the writing address can be detected on the basis of the difference between addresses, whereby the hold control can be realized with a simple hardware construction.

Furthermore, only with the simple hardware construction, the state of the processing circuit 32 waiting for the completion of writing corresponding to the next block can be detected as the address difference of one block, and switched to a hold state that is equivalent to the sleep state in which the supply of the clock is stopped.

[Embodiment 3]

A clock control type processor according to a third embodiment of the present invention, corresponding to claims 1, 3, 4, 11, 12, 19, 20, 23, 24, 25, and 27 will be described. The block difference detection circuit according to the first embodiment detects a difference between a processing block address and a writing block address, while a block difference detection circuit in the clock control type processor according to the third embodiment detects a difference between a processing block address and a reading block address.

Figure 7:
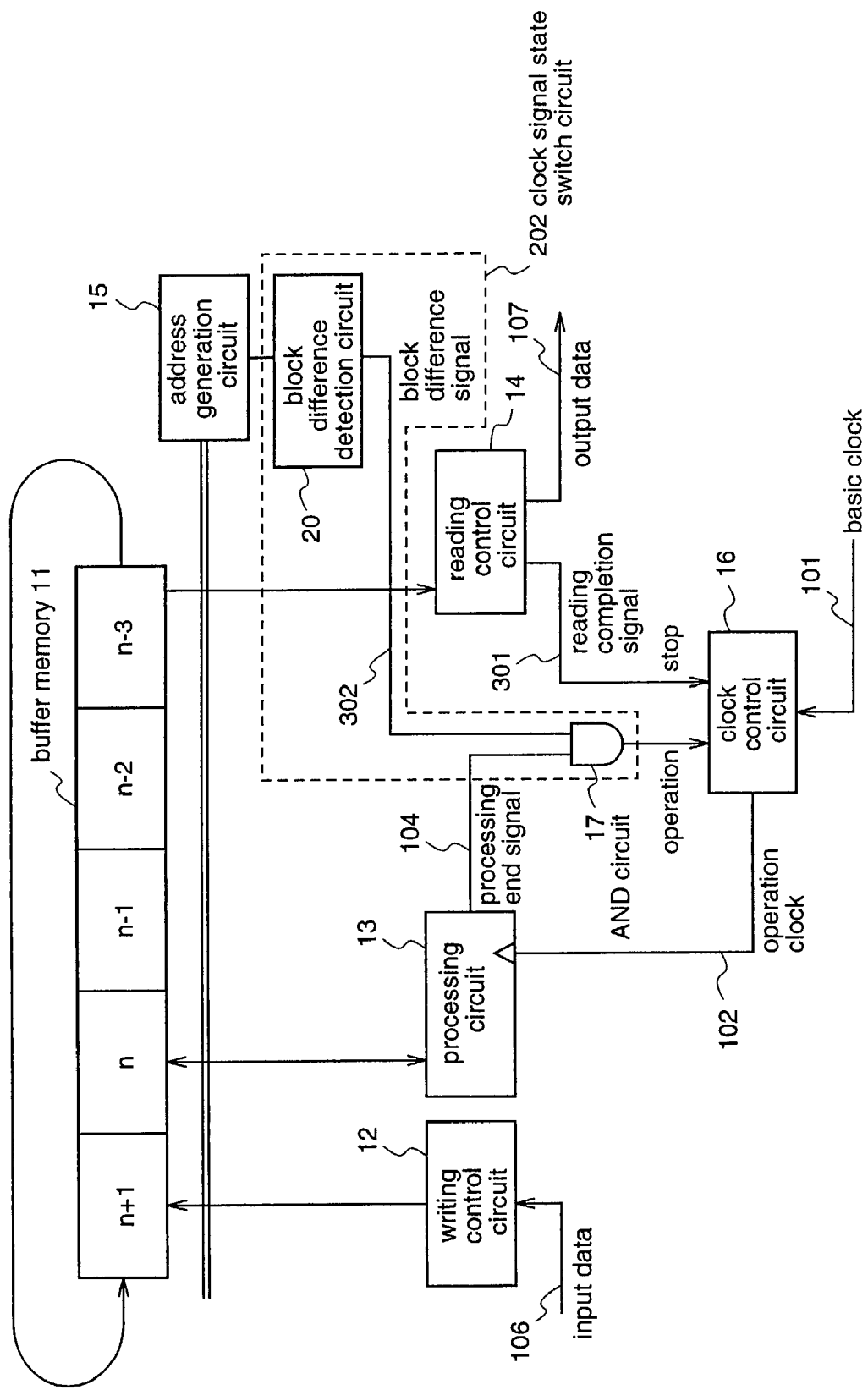
FIG. 7 is a block diagram illustrating an example of a clock control type processor according to a third embodiment of the present invention.

FIG. 7 is a block diagram illustrating an example of the clock control type processor according to the third embodiment. As in the first embodiment of FIG. 1, the processor will be described as an example of the operation system which temporarily stores data in a buffer memory to carry out processing.

In FIG. 7, a buffer memory 11 is a high-capacity memory element such as a DRAM. The buffer memory 11 is divided into areas each corresponding to a block which is to be subjected to processing, and one address is allocated to one block. There are three kinds of operations in which accesses to the buffer memory are made, i.e., a writing operation, a processing operation and a reading operation, and the accesses are controlled by a writing control circuit 12, a processing circuit 13, and a reading control circuit 14, respectively. An address generation circuit 15 controls addresses at which these accessing systems make access to the buffer memory 11 for avoiding an overflow or underflow, and makes the buffer memory carry out a ring operation. A block difference detection circuit 20 detects a difference between a reading block address and a processing block address which are controlled by the address generation circuit 15, and outputs a block difference signal 302. An AND circuit 17 generates an AND signal between the block difference signal 302 and a processing end signal 104, and constitutes together with the block difference detection circuit 20 a clock signal state switch circuit (clock signal state switch means) 202 that controls a clock control circuit 16 for switching the state of a clock between the normal state and the sleep state. The clock control circuit 16 has a basic structure that is the same as the structure shown in FIG. 17. The clock control circuit 16 receives a basic clock 101, and controls an operation clock 102 for the processing circuit 13.

The operation clock 102 can be activated by means of the AND circuit 17 by generating an AND signal between the processing end signal 104 from the processing circuit 13 and the block difference signal 302 from the block difference detection circuit 20, and can be stopped by a reading completion signal 301 from the reading control circuit 14.

Figure 8:
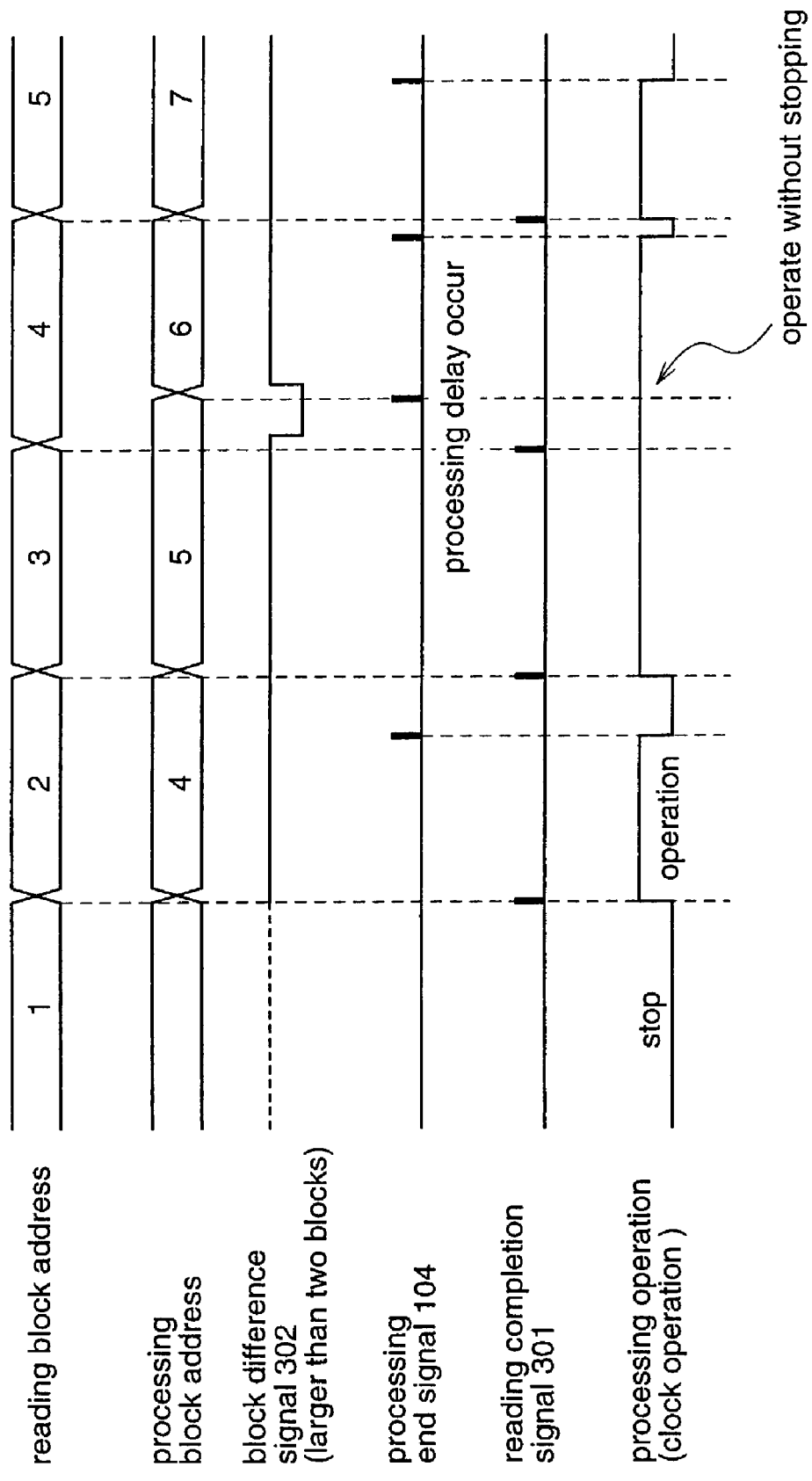
FIG. 8 is a timing chart showing an operation of the clock control type processor shown in FIG. 7.

FIG. 8 is a timing chart for explaining an operation of the clock control type processor according to the third embodiment as shown in FIG. 7, and shows a behavior when a processing time corresponding to a certain block gets longer. In this case, the processing of one block takes a time that is longer than a reading time corresponding to one block.

According to the conventional method, when there is a possibility that the clock operation may be stopped in accordance with the processing end signal 104 and the processing operation may be delayed with respect to the reading operation, a difference between the reading block address and a processing block address unfavorably becomes larger than "two". To overcome this situation, it is required to continue the clock operation and complete the processing for a block which is subjected to reading.

In this third embodiment, the block difference detection circuit 20 detects a difference between a reading block address and a processing block address to decide whether a clock is to be stopped or not at the end of processing corresponding to one block. In the case of the circuit structure as described in the third embodiment, the clock operation can be stopped when the difference is larger than two blocks (a second predetermined state, a second predetermined value), while the processing for the next block can be uninterruptedly continued when the processing is slightly delayed like in a case where the difference is only one block (the first predetermined state, the first predetermined value).

As described above, the clock control type processor according to the third embodiment detects a difference between a reading block address and a processing block address, thereby continuing the clock operation to continuously carry out processing for the next block whose reading has already been completed, when the processing operation is slightly delayed with respect to the reading operation. Thereby, a temporary delay in the processing operation can be permitted and accommodated, and a margin for the input/output rate can be gained. When the temporary delay in the processing operation is accommodated as described above, the processor immediately returns to a state having the normal operation, i.e., an operation in which the clock control circuit 16 passes through the basic clock 101 in accordance with an AND signal between the processing end signal 104 and the block difference signal 302 to supply the processing circuit 13 with this clock as an operation clock and interrupts the basic clock 101 in accordance with the reading completion signal 301 from the reading control circuit 14 to stop the supply of the operation clock 102, thereby stopping the processing circuit 13, then the processing circuit 13 stays in a waiting state until writing of the next block is completed, while stopping the operation clock, to reduce the power consumption. Therefore, it is possible to minimize an increase in the power consumption resulting from an increase in a period during which the operation clock cannot be stopped because a temporary delay in the processing operation is accommodated.

In addition, when the processing circuit 13 finishes processing corresponding to one block, the clock control can be performed while monitoring the progress in the operation processing on the basis of the state of the address generation circuit 15.

Further, the progress of the operation in the processing circuit 13 with relative to the reading address can be detected on the basis of the difference between addresses, whereby the clock control can be performed with a simple hardware construction.

Further, only with the simple hardware construction, the state of the processing circuit 13 waiting for the completion of reading corresponding to the next block can be detected as an address difference of one block, and switched to a sleep state in which the supply of the clock is stopped.

In addition, as the clock can be completely stopped to suppress the operation of the processing circuit 13 during a processing stopping period in the processing circuit 13, the power consumption can be greatly reduced by switching to a sleep state to completely stop the clock.

When the clock cannot be completely stopped to suppress the operation of the processing circuit 13 during a processing stopping period in the processing circuit 13, the power consumption can be reduced by reducing the clock frequency to a frequency that is lower than that of the normal state, as a sleep state.

[Embodiment 4]

Figure 9:
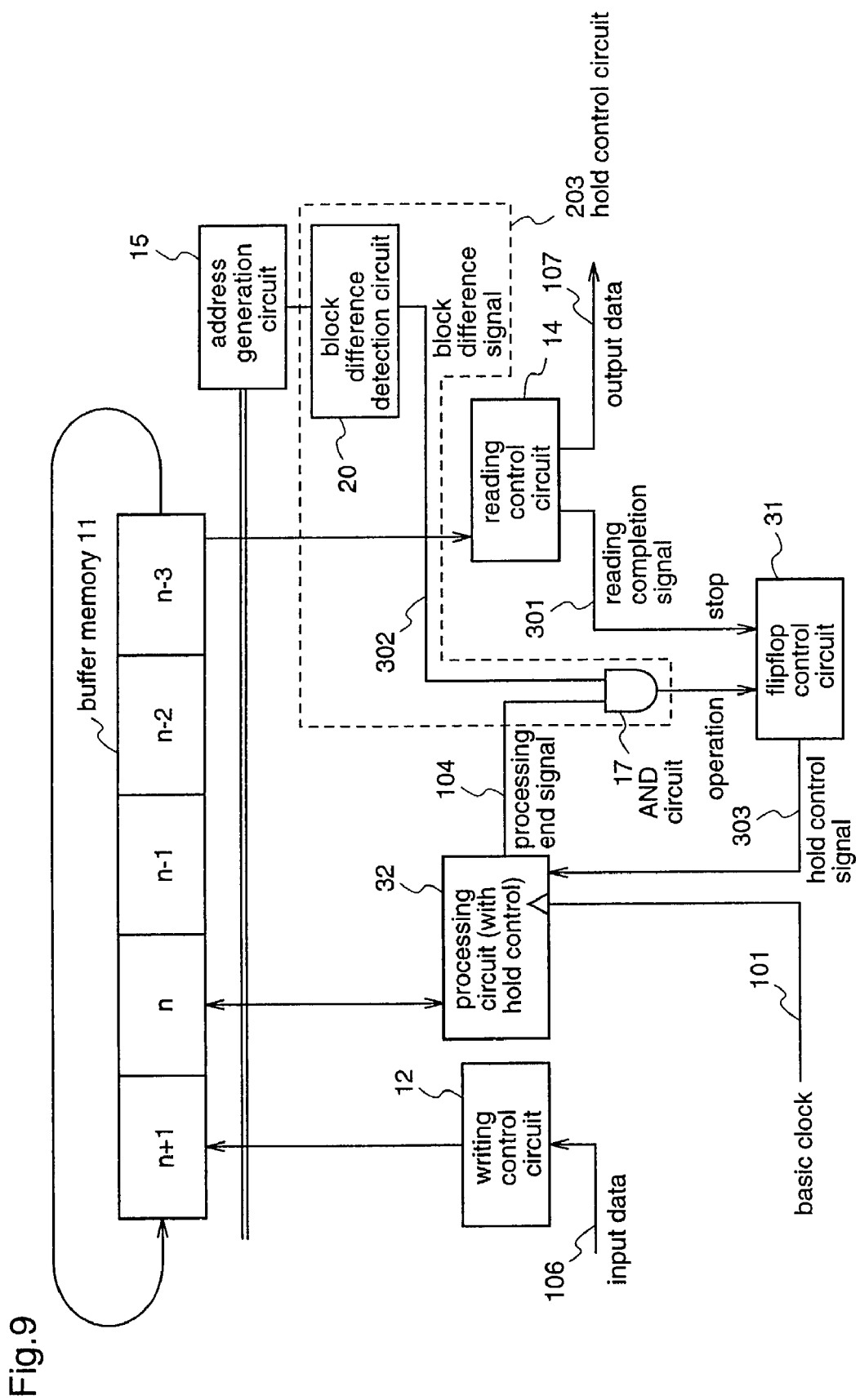
FIG. 9 is a block diagram illustrating an example of a clock control type processor according to a fourth embodiment of the present invention.

In the descriptions of the third embodiment, the clock control circuit performs control for switching whether the basic clock is interrupted or not, as in FIG. 1. However, as shown in FIG. 9, a basic clock is inputted directly to a processing circuit, a flipflop control circuit 31 is provided in place of the clock control circuit, and a hold control circuit 203 is provided on the operation signal side, to perform a hold control over a D-flipflop included in the processing circuit, thereby detecting the progress of the operation in the processing circuit 32 with relative to a reading address on the basis of a difference between addresses. Therefore, the clock control can be equivalently performed with a simple hardware construction, thereby obtaining the same effects as those in the case where the clock is directly controlled.

To be more specific, the clock control type processor according to the fourth embodiment detects a difference between a reading block address and a processing block address and, when the processing operation is delayed with respect to the reading operation, the D-flipflop in the processing circuit is not switched to a hold state, thereby equivalently continuing the clock operation and continuously performing processing for the next block whose reading has been already completed. Therefore, a temporary delay in the processing operation can be permitted and accommodated, and a margin for the input/output rate can be gained. When the temporal delay in the processing operation is accommodated in the above-mentioned manner, the processor immediately returns to a state having the normal operation, i.e., an operation in which the flipflop control circuit 31 switches the D-flipflop to a non-hold state in accordance with the processing end signal 104 from the processing circuit 32 to activate the processing circuit 32, and switches the D-flipflop to a hold state in accordance with the reading completion signal 301 from the reading control circuit 14 to stop the processing circuit 32, and the processing circuit 32 stays in a waiting state until writing of the next block is completed, while maintaining the hold state to reduce the power consumption. Therefore, it is possible to minimize an increase in the power consumption resulting from an increase in a period corresponding to a period during which the processing circuit cannot be switched to a hold state, i.e., the operation-clock cannot be stopped because the temporary delay in the processing operation is accommodated.

In addition, when the processing circuit 32 finishes processing of one block, the hold control can be performed while monitoring the progress of the processing operation on the basis of the state of the address generation circuit 15.

Further, the progress of the operation in the processing circuit 32 with relative to the reading address can be detected on the basis of the difference between addresses, whereby the hold control can be performed with a simple hardware construction.

Furthermore, only with the simple hardware construction, the state of the processing circuit 32 waiting for the completion of the reading of the next block can be detected as the address difference of one block, and switched to a hold state that is equivalent to the sleep state in which the supply of the clock is stopped.

[Embodiment 5]

A clock control type processor according to a fifth embodiment of the present invention, corresponding to claims 29 and 30, will be described. In this fifth embodiment, control in accordance with a processing permission signal that is inputted from outside of a circuit is further added to the processor according to the first embodiment.

Figure 10:
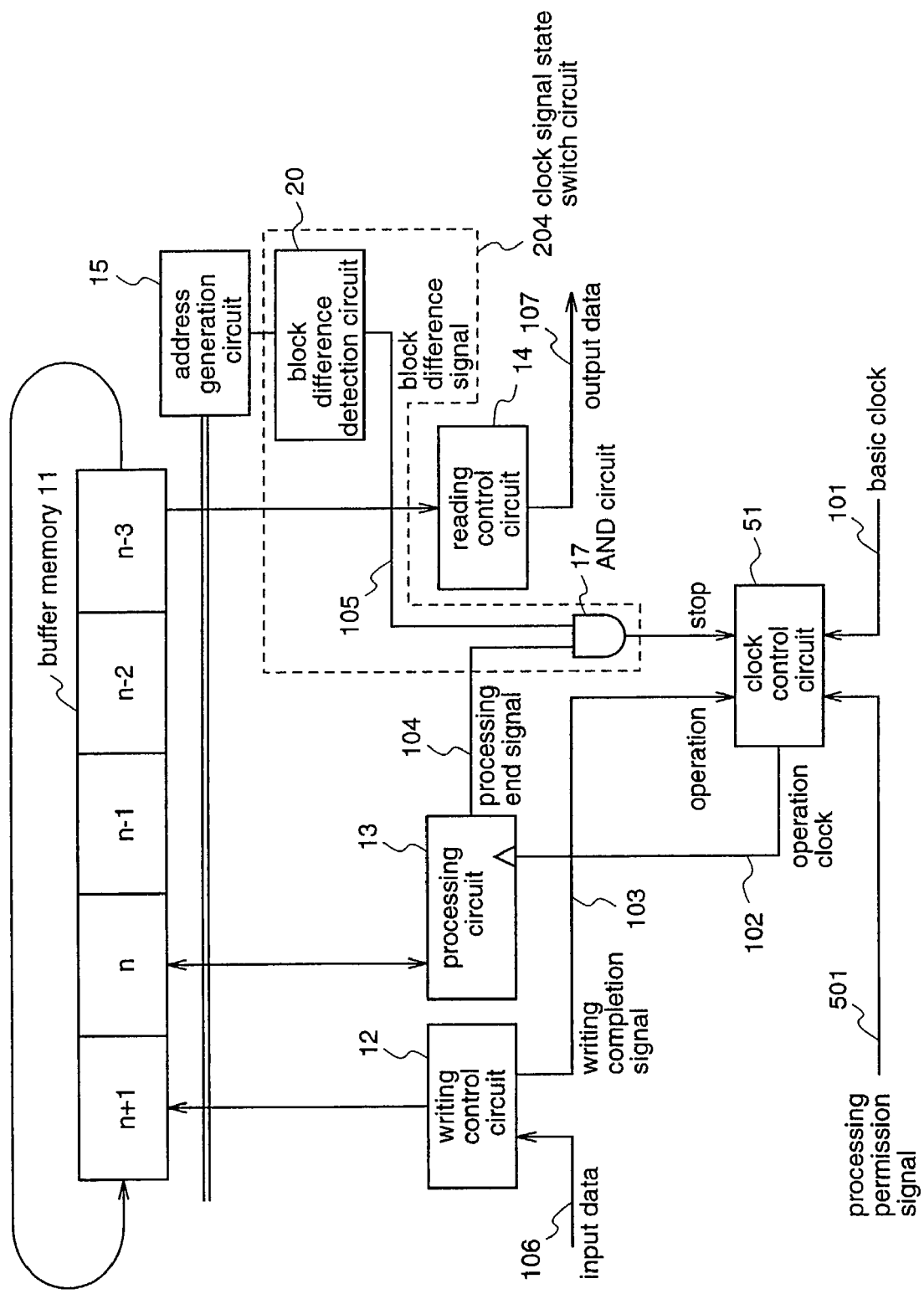
FIG. 10 is a block diagram illustrating an example of the clock control type processor according to a fifth embodiment of the present invention.

FIG. 10 is a block diagram illustrating an example of the clock control type processor according to the fifth embodiment. This processor will be described as an example of the operation system which temporarily stores data in a buffer memory to carry out processing, as in the prior art shown in FIG. 16.

In FIG. 10, a buffer memory 11, a writing control circuit 12, a processing circuit 13, a reading control circuit 14, an address generation circuit 15, and a block difference detection circuit 20 are the same as those in the first embodiment. A clock control circuit 51 receives a basic clock 101, and controls an operation clock 102 for the processing circuit 13. The clock control circuit 51 can activate the operation clock 102 in accordance with a writing completion signal 103 from the writing control circuit 12, or stop the operation clock 102 in accordance with an AND signal between a processing end signal 104 from the processing circuit 13 and a block difference signal 105 from the block difference detection circuit 20, which is obtained by an AND circuit 17, as well as can control the operation clock 102 in accordance with a processing permission signal 501 that is inputted from outside.

Figure 11:
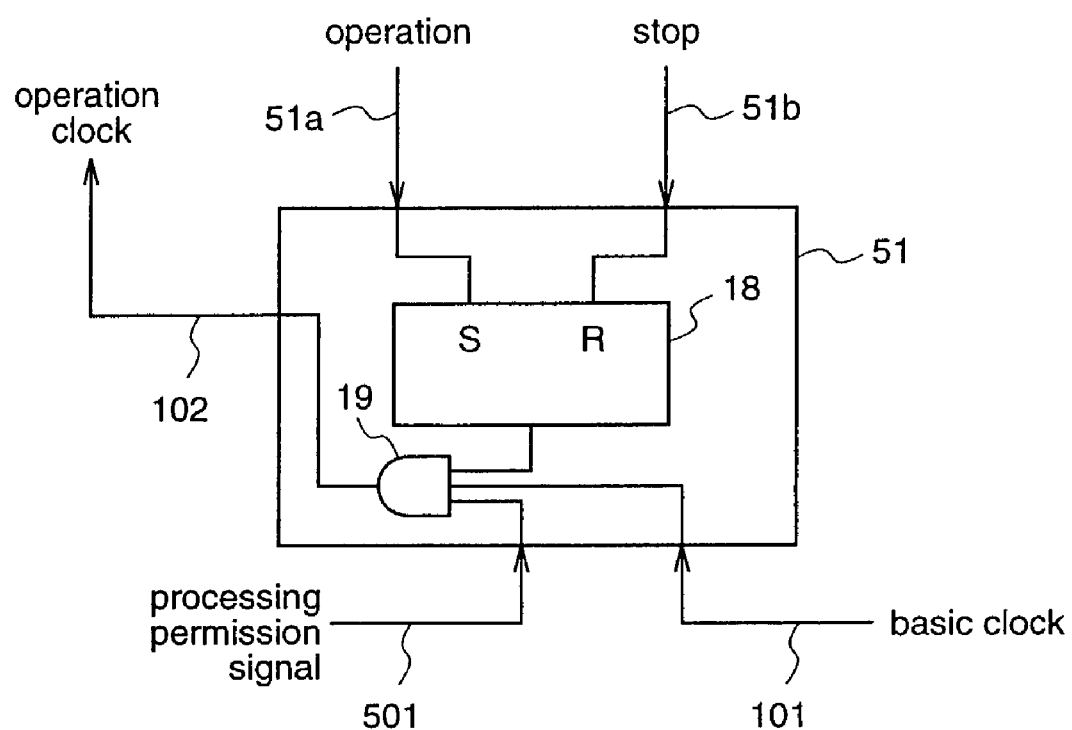
FIG. 11 is a diagram specifically illustrating a clock control circuit as shown in FIG. 10.

FIG. 11 is a diagram specifically illustrating the clock control circuit 51 of FIG. 10. The writing completion signal 103 and the AND signal are inputted to a R-S flipflop 18 in the clock control circuit 51. When the R-S flipflop is switched to a set state in accordance with the writing completion signal 103, the basic clock 101 is passed through an AND circuit 19 in accordance with the processing permission signal 501, and the operation clock 102 is supplied. Then, R-S flipflop is switched to a reset state in accordance with the AND signal to stop the operation clock 102, and the clock supplied is resumed in accordance with the next writing completion signal 103.

Figure 12:
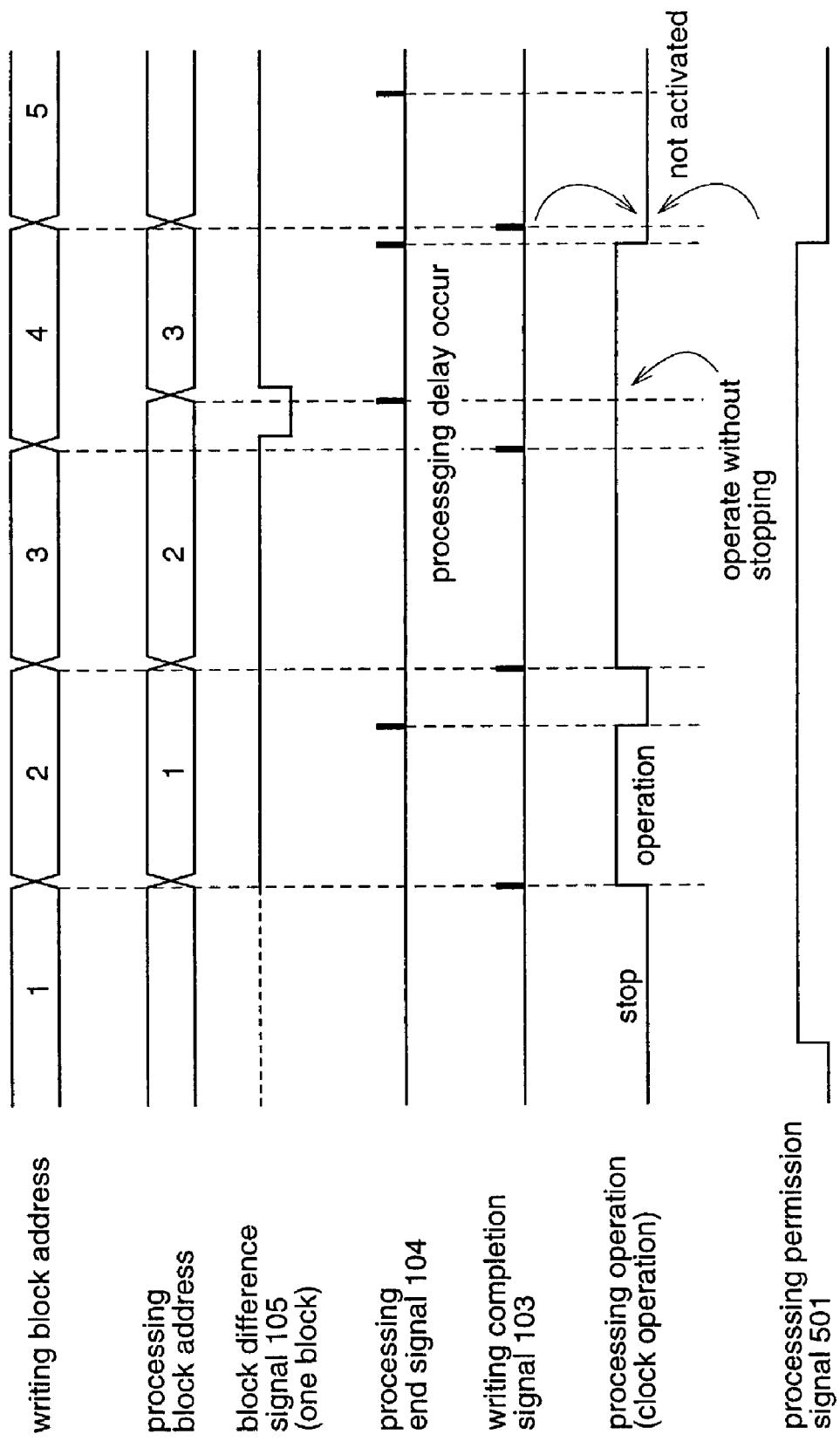
FIG. 12 is a timing chart showing an operation of the clock control type processor shown in FIG. 10.

FIG. 12 is a timing chart showing the operation of the clock control type processor according to the fifth embodiment, as shown in FIG. 10. Its basic operation is almost the same as that shown in FIG. 2.

In FIG. 12, the processing permission signal 501 is a control signal that is generated by a circuit which externally controls a system of the circuit operation such as a microcomputer, and can switch the clock for the processing circuit 13 to a sleep state as for a data block that requires no processing at the stand-by or the like, to control buffering of data into a memory and the processing operation. In the case as shown in FIG. 10, the processing permission signal 501 permits only processing of three blocks and, when the processing of the third block is finished, simultaneously turns the processing permission into unauthorized to stop the clock. Thereafter, even when a following block is written and the writing completion signal 12 is outputted, the clock is not activated.

As described above, in this fifth embodiment corresponding to claim 29 or 30, the state of the clock control circuit 16 is switched by the processing permission signal 501 that is inputted from outside, whereby the clock in a period during which no processing is required such as in a stand-by mode can be turned into a sleep state, and the power consumption can be effectively reduced.

Figure 13:
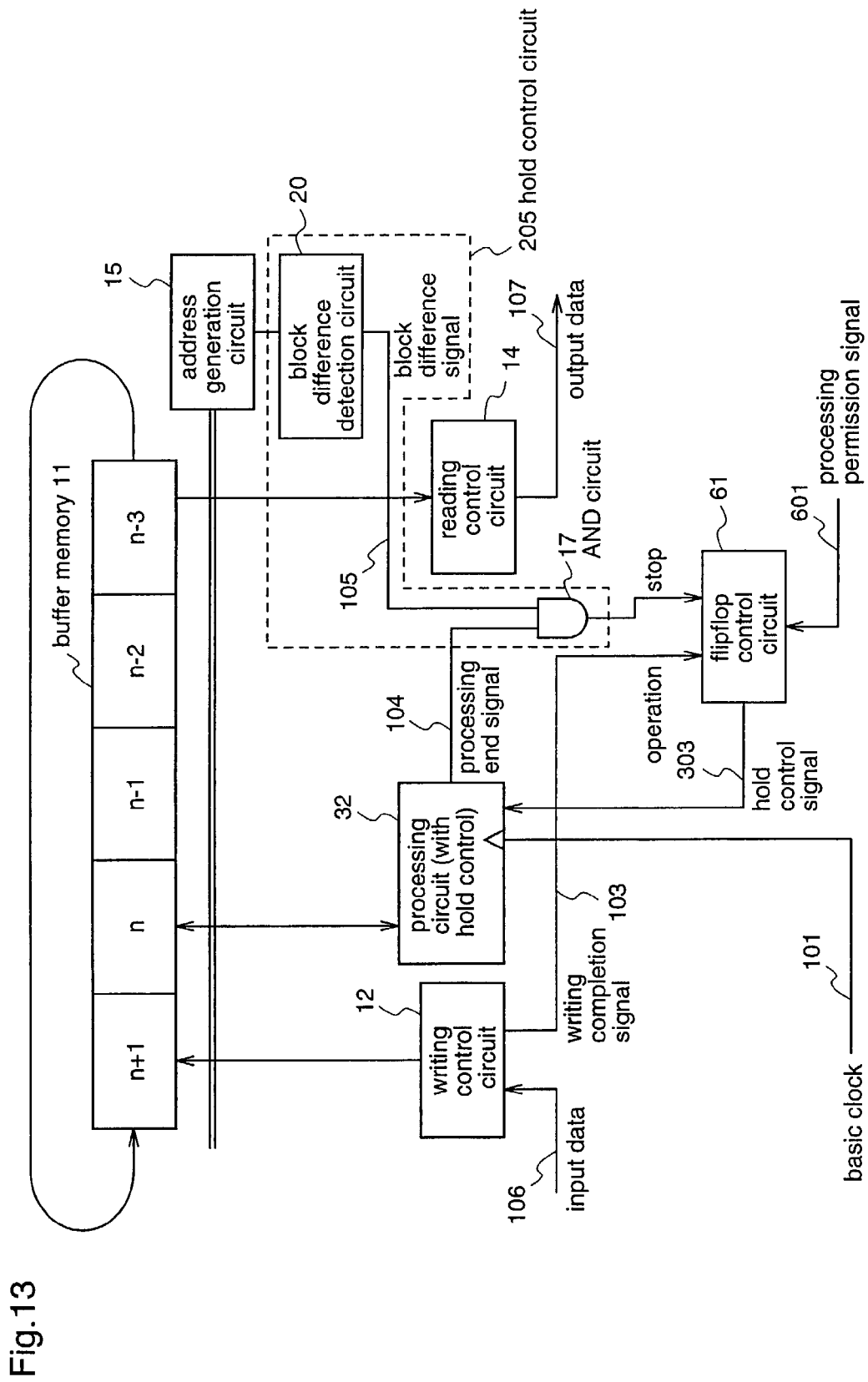
FIG. 13 is a block diagram illustrating another example of the clock control type processor according to the fifth embodiment.
Figure 14:
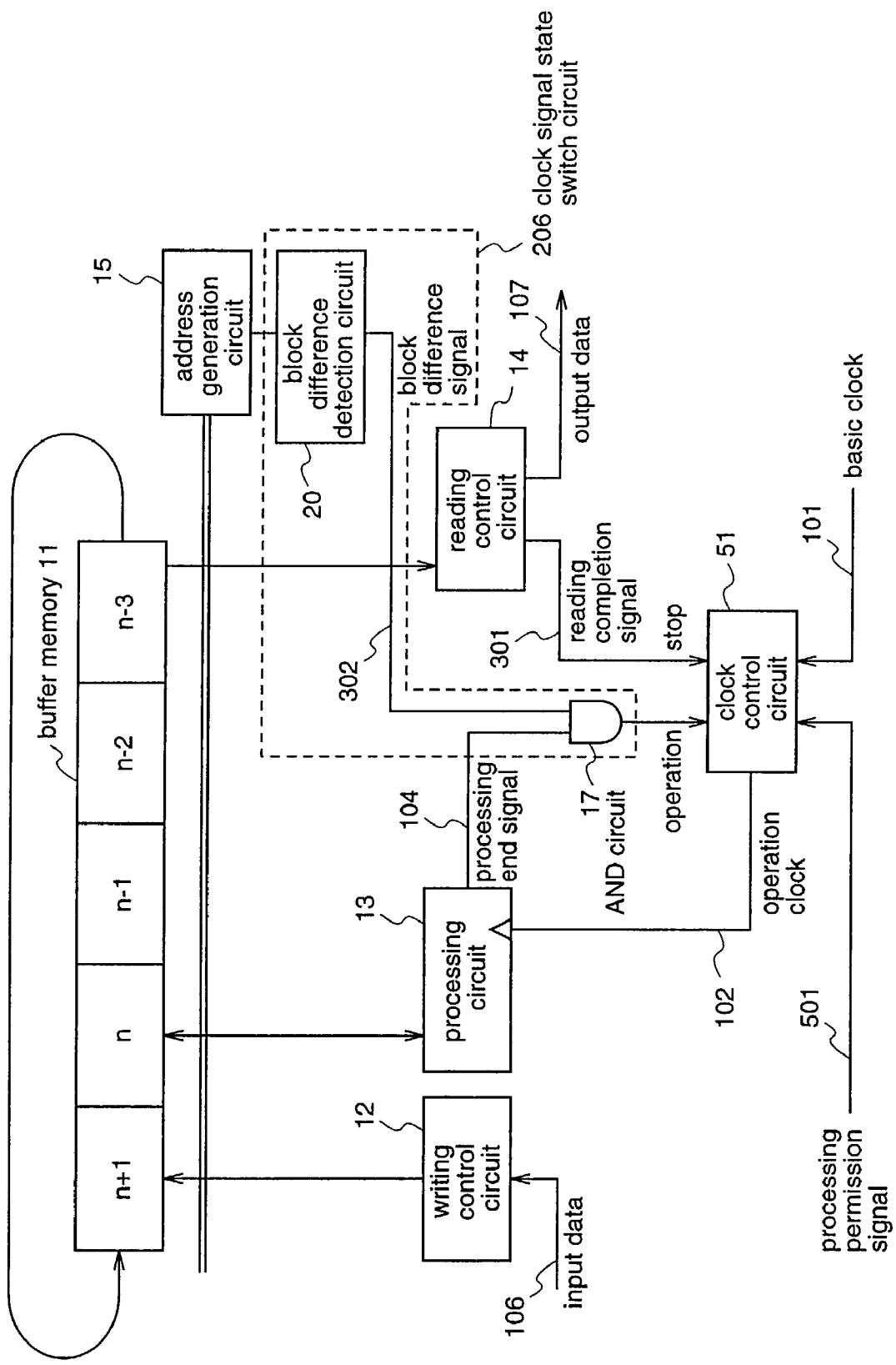
FIG. 14 is a block diagram illustrating still another example of the clock control type processor according to the fifth embodiment.
Figure 15:
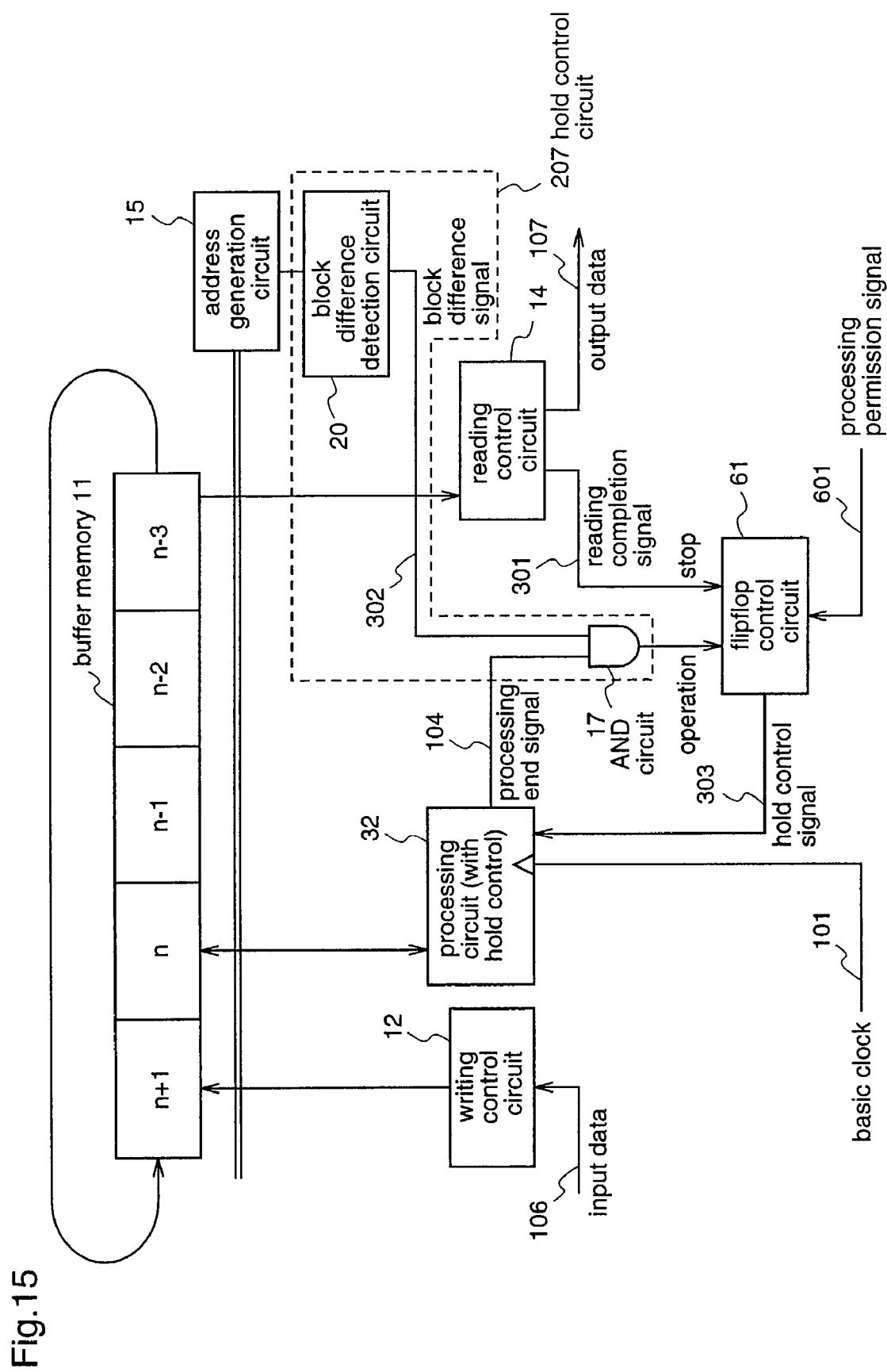
FIG. 15 is a block diagram illustrating still another example of the clock control type processor according to the fifth embodiment.

As shown in FIGS. 13, 14 and 15, the control in accordance with the processing permission signal which is inputted from outside of the circuit may be further added to the processor according to the second, third or fourth embodiment as shown in FIG. 3, 7 or 9, whereby the same effects as those of the processor as shown in FIG. 10 can be obtained.

In addition, it is possible that only the processing permission signal is given to the clock control circuit or the flipflop control circuit to switch the clock to the sleep state in accordance with the processing permission signal during a period in when the clock control and the processing according to any of the first to fourth embodiments are not required.

In the first embodiment, the first predetermined state (first predetermined value) is set at the address difference "2" and the second predetermined state (second predetermined value) is set at the address difference "1", and in the third embodiment the first predetermined state (first predetermined value) is set at the address difference "1" and the second predetermined state (second predetermined value) is set at the address difference "2". However, other values may be used as the address differences.

What is claimed is:

1. A processor including:
   storage means for storing inputted data;
   writing means for writing the inputted data in the storage means;
   processing means for reading data from the storage means and for processing the data;
   reading means for reading, from the storage means, data processed by the processing means;
   address generation means for generating an address in the storage means for the writing means, the processing means, or the reading means to perform writing/reading into/from the storage means;
   clock control means for switching between a normal state in which a clock signal is supplied to the processing means, and a sleep state in which the supply of the clock signal is stopped; and
   clock signal state switch means for preventing the clock control means from switching to the sleep state if the address generation means is in a predetermined state when the processing means finishes processing.

2. A processor including:
   storage means for storing inputted data;
   writing means for writing the inputted data in the storage means;
   processing means for reading data from the storage means and for processing the data;
   reading means for reading, from the storage means, data processed by the processing means;
   address generation means for generating an address in the storage means for the writing means, the processing means, or the reading means to perform writing/reading into/from the storage means;
   flipflop control means for controlling a flipflop included in the processing means to switch between a hold state in which data are held in a loop including the flipflop, and a normal state in which data are inputted/outputted into/from the flipflop; and
   hold means for preventing the flipflop control means from switching to the hold state if the address generation means is in a predetermined state when the processing means finishes processing.

3. The processor of claim 1 wherein
the clock signal state switch means switches the state of the clock signal to the normal state when the processing means finishes a processing one block corresponding to a predetermined amount of data and the address generation means enters a first predetermined state.

4. The processor of claim 1 wherein
the clock signal state switch means switches the state of the clock signal to the sleep state when the processing means finishes a processing one block corresponding to a predetermined amount of data and the address generation means enters a second predetermined state.

5. The processor of claim 2 wherein
the hold control means switches the state of the flipflop to the normal state when the processing means finishes processing one block corresponding to a predetermined amount of data and the address generation means enters a first predetermined state.

6. The processor of claim 2 wherein
the hold control means switches the state of the flipflop to the hold state when the processing means finishes processing one block corresponding to a predetermined amount of data and the address generation means enters a second predetermined state.

7. The processor of claim 1 wherein
the clock control means switches the state of the clock to the normal state when the processing means finishes a processing and a difference between an address in the storage means at which the processing has been finished and an address at which the writing means is writing to has a first predetermined value.

8. The processor of claim 1 wherein
the clock control means switches the state of the clock to the sleep state when the processing means finishes a processing and a difference between an address in the storage means at which the processing has been finished and an address at which the writing means is writing to has a second predetermined value.

9. The processor of claim 2 wherein
the flipflop control means switches the state of the flipflop to the normal state when the processing means finishes a processing and a difference between an address in the storage means at which the processing has been finished and an address at which the writing means is writing to has a first predetermined value.

10. The processor of claim 2 wherein
the flipflop control means switches the state of the flipflop to the hold state when the processing means finishes a processing and a difference between an address in the storage means at which the processing has been finished and an address at which the writing means is writing to has a second predetermined value.

11. The processor of claim 1 wherein
the clock control means switches the state of the clock to the normal state when the processing means finishes a processing and a difference between an address in the storage means at which the processing has been finished and an address at which the reading means is reading to has a first predetermined value.

12. The processor of claim 1 wherein
the clock control means switches the state of the clock to the sleep state when the processing means finishes a processing and a difference between an address in the storage means at which the processing has been finished and an address at which the reading means is reading from has a second predetermined value.

13. The processor of claim 2 wherein
the flipflop control means switches the state of the flipflop to the normal state when the processing means finishes a processing and an difference between an address in the storage means at which the processing has been finished and an address at which the reading means is reading from has a first predetermined value.

14. The processor of claim 2 wherein
the flipflop control means switches the state of the flipflop to the hold state when the processing means finishes a processing and a difference between an address in the storage means at which the processing has been finished and an address at which the reading means is reading from has a second predetermined value.

15. The processor of claim 7 wherein
addresses are allocated to the storage means in units of storage areas each storing a block corresponding to a predetermined amount of data processed by the processing means, and
the clock control means switches the state of the clock to the normal state when the processing means finishes the processing and a difference between an address at which the processing has been finished and an address at which the writing means is performing writing has a value exceeding one block.

16. The processor of claim 8 wherein
addresses are allocated to the storage means in units of storage areas each storing a block corresponding to a predetermined amount of data processed by the processing means, and
the clock control means switches the state of the clock to the sleep state when the processing means finishes the processing and a difference between an address at which the processing has been finished and an address at which the writing means is performing writing has a value corresponding to one block.

17. The processor of claim 9 wherein
addresses are allocated to the storage means in units of storage areas each storing a block corresponding to a predetermined amount of data which is subjected to the processing by the processing means, and
the flipflop control means switches the state of the flipflop to the normal state when the processing means finishes the processing and a difference between an address at which the processing has been finished and an address at which the writing means is writing to has a value exceeding one block.

18. The processor of claim 10 wherein
addresses are allocated to the storage means in units of storage areas each storing a block corresponding to a predetermined amount of data processed by the processing means, and
the flipflop control means switches the state of the flipflop to the hold state when the processing means finishes the processing and a difference between an address at which the processing has been finished and an address at which the writing means is writing to has a value corresponding to one block.

19. The processor of claim 11 wherein
addresses are allocated to the storage means in units of storage areas each storing a block corresponding to a predetermined amount of data processed by the processing means, and
the clock control means switches the state of the clock to the normal state when the processing means finishes the processing and a difference between an address at which the processing has been finished and an address at which the reading means is reading from has a value exceeding one block.

20. The processor of claim 12 wherein
addresses are allocated to the storage means in units of storage areas each storing a block corresponding to a predetermined amount of data processed by the processing means, and
the clock control means switches the state of the clock to the sleep state when the processing means finishes the processing and a difference between an address at which the processing has been finished and an address at which the reading means is reading from has a value corresponding to one block.

21. The processor of claim 13 wherein
addresses are allocated to the storage means in units of storage areas each storing a block corresponding to a predetermined amount of data processed by the processing means, and
the flipflop control means switches the state of the flipflop to the normal state when the processing means finishes the processing and a difference between an address at which the processing has been finished and an address at which the reading means is reading from has a value exceeding one block.

22. The processor of claim 14 wherein
addresses are allocated to the storage means in units of storage areas each storing a block corresponding to a predetermined amount of data processed by the processing means, and
the flipflop control means switches the state of the flipflop to the hold state when the processing means finishes the processing and a difference between an address at which the processing has been finished and an address at which the reading means is reading from has a value corresponding to one block.

23. The processor of claim 1 wherein
the sleep state of the clock signal is a state in which the clock signal is completely stopped.

24. The processor of claim 1 wherein
the sleep state of the clock signal is not a state in which the supply of the clock signal is stopped but a state in which a clock frequency is reduced to a frequency that is lower than a clock frequency of the normal state.

25. The processor of claim 1 wherein
the clock control means can control the switching of the state in accordance with a processing permission signal that is inputted from outside.

26. The processor of claim 2 wherein
the flipflop control means can control the switching of the state in accordance with a processing permission signal that is inputted from outside.

* * * * *